US007660352B2

(12) United States Patent
Yamane et al.

(10) Patent No.: US 7,660,352 B2
(45) Date of Patent: Feb. 9, 2010

(54) APPARATUS AND METHOD OF PARALLEL PROCESSING AN MPEG-4 DATA STREAM

(75) Inventors: Masahito Yamane, Kanagawa (JP); Jason N. Wang, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 918 days.

(21) Appl. No.: 10/406,840

(22) Filed: Apr. 4, 2003

(65) Prior Publication Data
US 2004/0196905 A1 Oct. 7, 2004

(51) Int. Cl.
H04B 1/66 (2006.01)
H04N 7/12 (2006.01)
(52) U.S. Cl. .................................. 375/240.12
(58) Field of Classification Search ............ 375/240.12, 375/240.18, 240.02, 240.03, 240.27, 240.15, 375/240.13, 240.16, 240.25; 382/232; H04N 7/12; H04B 1/66
See application file for complete search history.

(56) References Cited

U.S. PATENT DOCUMENTS

| 5,455,629 | A | * | 10/1995 | Sun et al. ............... 375/240.27 |
| 5,684,791 | A | | 11/1997 | Raychaudhuri et al. ..... 370/278 |
| 5,757,416 | A | * | 5/1998 | Birch et al. ................. 725/144 |
| 5,767,799 | A | * | 6/1998 | Maertens et al. .............. 341/67 |
| 5,852,805 | A | * | 12/1998 | Hiratsuka et al. ........... 704/500 |
| 5,920,353 | A | * | 7/1999 | Diaz et al. ............. 375/240.15 |
| 5,959,659 | A | | 9/1999 | Dokie .......................... 348/7 |
| 6,016,348 | A | | 1/2000 | Blatter et al. ................. 380/5 |
| 6,222,841 | B1 | | 4/2001 | Taniguchi .................... 370/389 |
| 6,415,031 | B1 | * | 7/2002 | Colligan et al. ............. 380/200 |
| 6,538,999 | B1 | | 3/2003 | Sato ............................ 370/252 |
| 6,728,318 | B2 | * | 4/2004 | Lin et al. ............... 375/240.27 |
| 6,778,610 | B2 | * | 8/2004 | Lin ......................... 375/240.27 |
| 6,836,514 | B2 | * | 12/2004 | Gandhi et al. .......... 375/240.27 |
| 6,963,613 | B2 | * | 11/2005 | MacInnis et al. ....... 375/240.25 |
| 6,983,014 | B1 | * | 1/2006 | Kuroda et al. .......... 375/240.02 |
| 6,988,238 | B1 | * | 1/2006 | Kovacevic et al. .......... 714/799 |
| 7,062,096 | B2 | * | 6/2006 | Lin et al. ..................... 382/232 |
| 7,158,571 | B2 | * | 1/2007 | Wang et al. ............. 375/240.23 |
| 7,327,790 | B1 | * | 2/2008 | Bretl et al. ............. 375/240.26 |
| 2003/0081843 | A1 | * | 5/2003 | Lee ........................... 382/233 |
| 2003/0152149 | A1 | * | 8/2003 | Denolf .................. 375/240.24 |
| 2005/0283819 | A1 | | 12/2005 | Shimoji et al. .............. 725/142 |

OTHER PUBLICATIONS

John Watkins, "MPEG-2" Chapter 1, "Introduction to Compression," pp. 1-10.

(Continued)

Primary Examiner—Tung Vo
(74) Attorney, Agent, or Firm—Haverstock & Owens LLP

(57) ABSTRACT

An apparatus and method of decoding coded video bitstreams is disclosed. The apparatus comprises a first processor and a second processor configured to operate in parallel. The main processor receives the coded video bitstream, parses it, and calls the second processor to decode the coded video bitstream to retrieve macroblock data. If an error occurs during decoding, the second processor signals the first processor, which can instruct the second processor to perform an error recovery routine. The first processor the performs dequantization and inverse DCT to recover digital pixel data from the macroblocks so that an image formed from the digital pixel data can be later displayed on a monitor.

77 Claims, 15 Drawing Sheets

OTHER PUBLICATIONS

John Watkins, "MPEG-2" Chapter 6, "Program and Transport Streams" 222-232.

Michael Robin, "MPEG coding System", Broadcast Engineering, Aug. 1999, pp. 1-6.

"Network Provisioning for MPEG-2 Bandwidth", Cisco Systems, Inc., 1992-2001, pp. 1-5.

"Section 7: Transport Streams", Tektronix MBD: Applications, http://www.tektronix.com/Measurement/App_Notes/mpegfund/sect7.html May 16, 2001, pp. 1-5.

Steffen Lindner, "Clocks and Timestamps", PixStream Incorporated,http://www.pixstream.com/education/Papers/Clocks_stamps.htm, May 18, 2001, pp. 1-2.

"MPEG-2 Program Specific Information (PSI Tables)".

"Measurement on MPEG2 and DVB-T Signals (1)".

"Transport Stream Analysis" Adherent, http://www.adherent.com/focus/focus_tsa.htm, May 16, 2001, pp. 1-3.

Raj Jain, "Audiovisual Multimeda Services (AMS)", Professor of Computer and Information Science,http://www.cis.ohio-state.edu/~jain/, p. 1.

"Digital Video Broadcasting", http://home.mira.net/~marcop/digital.htm, May 16, 2001, pp. 1-7.

Paul Freeman, "Implementing the ATSC PSIP Standard" SoftProse, Inc., www.softproseinc.com/, pp. 1-34.

"MPEG Program Specific Information (PSI)"http://www.zenith.com/mpeg_tutorial/mpegpsi.HTM, May 16, 2001, p. 1-1.

"PCR-Program Clock Reference", http://www.zenith.com/mpeg_tutorial/PCR.HTM May 18, 2001, p. 1-1.

"PES Packets and Elementary Streams", http://www.zenith.com/mpeg_tutorial/pespckt.HTM, May 17, 2001, pp. 1-2.

"Premilinary—Specification of TS-DMUX module" Hirotech, Inc., Apr. 30, 1998, pp. 2-29.

"PAT and PMT", http://www.sarnoff.com/tech_realworld/broadcast/psip/ATSC_PSIP/tsld039.htm, May 16, 2001, pp. 1-2.

Ghyslain Pelletier, "An Overview of the MPEG-2 Transport Stream in Digital Video Broadcasting", Computer Science Department, University of Lulea, Sweden, {pelle@cdt.luth.se}, 3 pgs.

Raj Jain, "MPEG-2 Clock Synchronization" The Ohio State University, pp. 11-12.

Michael Isnardi, "DTV Multicasting",http://www.broadcastengineering.com/archives/0998/199809he41.html, May 17, 2001, pp. 1-5.

"MPEG-2 Transmission", http://www.erg.abdn.ac.uk/public_html/research/future-net/digital-video/mpeg2-trans.html, May 16, 2001, pp. 1-10.

"Information Technology—Generic Coding of Moving Pictures and Associated Audio Information: Systems", International Standard, ISO/IEC 13818-1, Second Edition Dec. 1, 2000, 172 pgs.

"Datasheet: MAP-CA DSP MPEG-4 Video Decoder", Equator Technologies, Inc. May 11, 2001.

Steven Gringeri et al., "Robust Compression and Transmission of MPEG-4 Video", GTE Laboratories, Incorporated, pp. 1-26.

"MPEG: the hierarchical structure", pp. 1-4.

"MPEG-4 Video Encoder, CS6701 Preliminary Product Brief", 2002 Amphion Semiconductor Ltd., pp. 1-4.

"MPEG-1 Video Codec", MPEG-1 Coding Standard, pp. 1-11.

Egbert G.T. Jaspers et al. "System-level Analysis for MPEG-4 Decoding on a Multi-processor Architecture".

"Information technology—Coding of audio-visual objects—Part 2: Visual", International Standard, $2^d$ Ed, Dec. 1, 2001, pp. 1-517.

* cited by examiner

| Y pixel | | | |
|---|---|---|---|
| Cr | | | |
| Cb | | | |

| Code | Character |
|---|---|
| 000 | 10001010 |
| 001 | 10110000 |
| ⋮ | |
| 1011 | 11001101 |
| ⋮ | |
| 11011 | 01100101 |

1401

1402 ⎣11011⎦⎣000⎦⎣1011⎦ → Huffman Decoder → ⎣01100101⎦⎣10001010⎦⎣11001101⎦ 1404

1403

| Code | Character |
|---|---|
| 000 | 10001010 |
| 100 | 10110000 |
| ⋮ | ⋮ |
| 1101 | 11001101 |
| ⋮ | ⋮ |
| 11011 | 01100101 |
*Fig. 16*
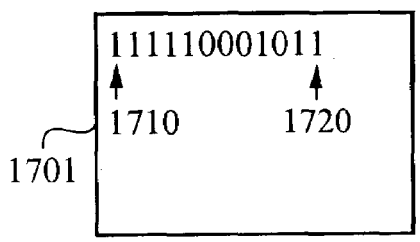
*Fig. 17A*
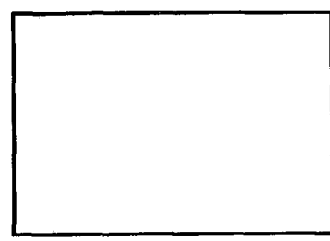
*Fig. 18A*
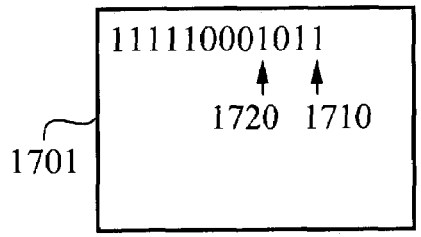
*Fig. 17B*
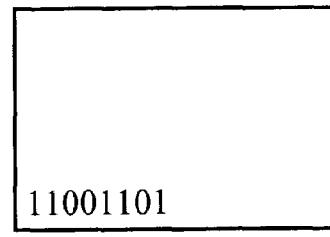
*Fig. 18B*
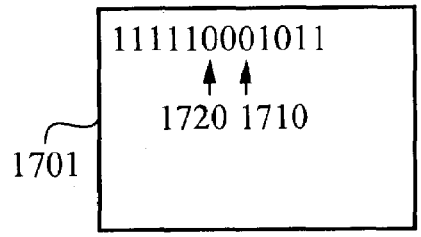
*Fig. 17C*
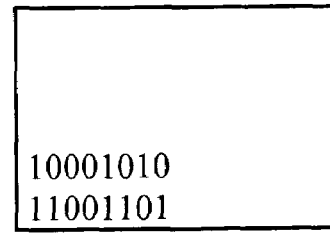
*Fig. 18C*
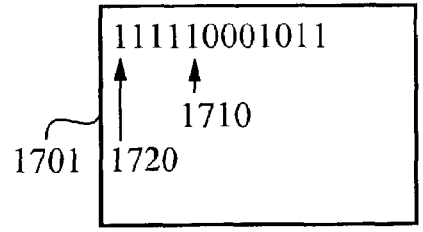
*Fig. 17D*
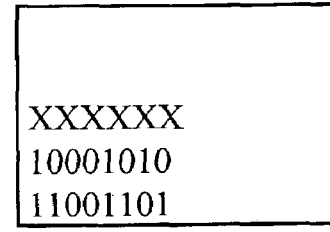
*Fig. 18D*

APPARATUS AND METHOD OF PARALLEL PROCESSING AN MPEG-4 DATA STREAM

FIELD OF THE INVENTION

This invention relates to the field of data processing. More particularly, this invention relates to decoding video objects encoded according to the MPEG-4 standard.

BACKGROUND OF THE INVENTION

Video encoding schemes, for either still or motion pictures, generally compress video data. Compression allows video data to be more efficiently transported over a network, conserving bandwidth, or more efficiently stored in computer memory.

FIG. 1 illustrates one way that video data is transmitted from a source 100 to a destination 120. The video data can be digital pixel data captured by a video camera, downloaded from a Web site, stored on a DVD, or generated using other means. The source 100 comprises a memory 101 coupled to an encoder 105. The encoder 105 is in turn coupled to a network 110, such as the Internet. The destination 120 comprises a decoder 121 coupled to the network 110 and to a memory 125. In operation, digital pixel data is first stored in the memory 101. The digital pixel data is compressed by the encoder 105 to generate compressed video data, which is transmitted over the network 110. The compressed video data is received and decompressed by the decoder 121 to recover the digital pixel data, which is stored in the memory 125. A display engine (not shown) can then read the digital pixel data stored in the memory 125 and display it on a display device (not shown), such as a computer monitor.

FIG. 2 shows a more detailed view of an encoder 130. The encoder 130 comprises a motion estimation or compensation component 131 coupled to a DCT and quantization component 133, which in turn is coupled to a Huffman encoder 137. The motion estimation or compensation component 131 receives digital pixel data and uses redundancies in the digital pixel data to compress the digital pixel data. The DCT and quantization component 133 performs two functions: First, it translates digital pixel data in the spatial domain into DCT coefficients in the frequency domain. Second, it quantizes the DCT coefficients, packages runs of DCT coefficients, and combines the packaged DCT coefficients with quantization headers to form macroblocks. As discussed below, macroblocks contain strings of bits that are the integer representations of the DCT coefficients. Macroblocks also contain headers, which contain information used to reconstruct digital pixel data. The Huffman encoder 137 receives the macroblocks and uses statistical encoding to compress the macroblocks to form a coded video bitstream containing compressed digital pixel data. The Huffman encoder 137 uses a table to map integer representations of the DCT coefficients (characters) in the macroblock into unique variable-length codes (VLCs), also called symbols. The VLCs are chosen so that, on average, the total length of the VLCs is less than the total length of the original macroblock. Thus, the coded bitstream is generally smaller than the original digital pixel data so that it requires less bandwidth when transmitted over a network and less memory when stored in memory.

FIG. 3 shows a more detailed view of a decoder 140. The decoder 140 comprises a Huffman decoder 141 coupled to a dequantization and inverse DCT component 142, which in turn is coupled to a motion estimation or compensation component 143. In operation, the Huffman decoder 141 receives a coded video bitstream, containing compressed digital pixel data, over a network or another transmission medium. The Huffman decoder 141 performs an inverse function to that performed by the Huffman encoder 135 (FIG. 2). The Huffman decoder 141 thus performs a table lookup to map symbols to characters and thus recover macroblock data from the coded video bitstream. The macroblock data is then transmitted to the dequantization and inverse DCT component 142 to recover the original digital pixel data. The dequantization and inverse DCT component 142 performs a function inverse to that of the DCT and quantization component 133 (FIG. 2) to generate digital pixel data. The motion compensation or estimation module 143 then performs motion compensation to recover the original pixel data. The recovered original digital pixel data is then stored in a memory (not shown), from which it can be retrieved by a display engine for later display on a display device. Digital pixel data is usually stored as frames, which when displayed sequentially, render a moving picture.

Compression becomes increasingly important when new generations of video data are transmitted or stored. For example, under the MPEG-4 standard, standardized in "Information Technology—Coding of audio-visual objects—Part 2: Visual," reference number ISO/IEC 14496-2:2001(E), incorporated herein by reference, video data can be packaged with audio data, computer-generated images, and other data. Under the MPEG-4 standard, separate video objects that together make up a scene can be transmitted separately, thus allowing users to manipulate video data by adding, deleting, or moving objects within a scene. Under the MPEG-4 standard, other information, such as that used to perform error recovery, is also transmitted with the video data.

This increased flexibility is achieved by transmitting extra data to an end user. Transmitting extra data increases the time it takes to decode the coded video data at a destination. For an end user at the destination to realize the added capabilities of video transmitted according to the MPEG-4 standard, especially for real-time applications, the coded video data must be decoded as quickly and efficiently as possible.

One video decoder, from Equator Technologies, Inc., employs two processors in an attempt to decrease the time it takes to decode coded video data to generate digital pixel data. FIG. 4 illustrates an Equator decoder 200, the MAP-CA DSP MPEG-4 video decoder, available from Equator Technologies, Inc., of Campbell, Calif. The Equator decoder 200 apportions tasks between the two processors in an attempt to decrease the total decoding time. As illustrated in FIG. 4, the Equator decoder 200 comprises (a) a variable length encoder/decoder, the VLx coprocessor 210; and (b) a very-long instruction word core central processing unit, the VLIW core 220. The VLx coprocessor 210 is coupled to a first DataStreamer controller buffer 230, which in turn is coupled to an input bitstream memory 231. The VLx coprocessor 210 is coupled to the VLIW core 220 by a second DataStreamer controller buffer 232. The VLx coprocessor 210 comprises a GetBits engine 211 coupled on one end to the first DataStreamer controller buffer 230 and on another end to a VLx CPU 212. The VLx CPU 212 is coupled to a VLx memory 213, which in turn is coupled to the second DataStreamer controller buffer 232. As illustrated in FIG. 4, the VLx memory 213 is partitioned into two frame buffers. The VLIW core 220 comprises a data cache 221 coupled on one end to the second DataStreamer controller buffer 232 and on another end to a VLIW core CPU 222. As illustrated in FIG. 4, the data cache 221 is partitioned into four frame buffers.

In operation, a coded video bitstream containing variable-length codes (VLCs) is stored in the input bitstream memory 231. The coded bitstream is then transferred to the first DataStreamer controller buffer 230, from which the GetBits engine 211 can transfer it to the VLx CPU 212. The VLx CPU 212 then (1) decodes the header symbols and stores the results in a header information buffer, (2) decodes the macroblock symbols and stores them in a macroblock information buffer, and (3) produces DCT coefficients. The second DataStreamer controller buffer 232 transfers the DCT coefficients to the data cache 221. The VLIW core 222 then reads the DCT coefficients stored in the data cache 221 and performs inverse quantization, inverse DCT, motion compensation, and pixel additions to produce pictures for rendering on a display device, such as a personal computer monitor or an NTSC monitor.

The Equator decoder 200 is ill-equipped to efficiently recover digital pixel data. For example, if the VLx CPU 212 encounters an error while computing DCT coefficients, it cannot rely on the computational power of the VLIW core 222 to help it recover from the error. Instead, the VLx CPU 212 must either (1) try to recover from the error itself or (2) let the VLIW core 220 handle the error itself. The second alternative interrupts the VLIW core 220 from performing other high-level processing and does not involve the VLx CPU 212, which is generally better suited to process the DCT coefficients.

Accordingly, there is a need for an apparatus and method of decompressing video data without monopolizing a high-level processor that is ill-equipped to decode data quickly and efficiently.

SUMMARY OF THE INVENTION

A data processing system decodes a coded video bitstream to produce digital pixels from which a video image or a series of video images can be rendered. The data processing system comprises a first processor and a second processor which execute in parallel. Preferably, the first processor is a general-purpose processor, and the second processor is an application-specific processor. The first processor reads the coded video bitstream, performing high-level decoding, such as dividing the bitstream into data segments and calling the second processor to decode data segment and extract macroblock data. Preferably, the data segments contain compressed macroblock information compressed according to the MPEG-4 standard. The second processor decompresses the compressed macroblock information to recover the macroblock information. The first processor then processes the macroblock information to recover the digital pixels. Preferably, the first processor performs dequantization, and inverse DCT to recover the digital pixel data. Preferably, when the second processor encounters an error, it signals the main processor, which instructs the second processor to perform an error recovery routine.

In a first aspect of the present invention, a data processing system for translating a coded bitstream delimited by a plurality of markers into pixel data suitable for rendering video images comprises a first processor configured to parse the coded bitstream and divide the coded bitstream into multiple segments delimited by the plurality of markers and a second processor configured to process a portion of the multiple segments and translate the portion of multiple segments into decoded data elements. The first processor processes the decoded data elements to generate the pixel data and further wherein the first processor and the second processor are configured to operate in parallel. Preferably, the second processor is configured to process variable-length data. In one embodiment, the second processor comprises a reduced instruction set computer. The coded bitstream is a compressed bitstream. Preferably, the compressed bitstream is encoded according to an MPEG standard. Preferably, the MPEG standard is the MPEG-4 standard. Alternatively, the compressed bitstream is encoded according to a JPEG standard. Alternatively, the compressed bitstream is encoded according to one of the H.261 standard and the H.263 standard. The markers are video object plane start codes indicating the start of a video object. The decoded data elements comprise macroblocks containing integers representing discrete cosine transform (DCT) coefficients of the pixel data. In a further embodiment, the first processor processing the data elements to generate pixel data comprises dequantizing the DCT coefficients to generate dequantized DCT coefficients and performing an inverse DCT transformation on the dequantized DCT coefficients to generate the pixel data. In a further embodiment, the data processing system further comprises an external memory configured to store a portion of the coded bitstream and a portion of the decoded data elements and a high-speed bus coupling the first processor and the second processor to the external memory. The first processor comprises a first cache. The second processor comprises a second cache.

In another aspect of the present invention, a data processing system for translating a coded bitstream delimited by a plurality of markers into pixel data suitable for rendering video images comprises a first means for processing configured to parse the coded bitstream and divide the coded bitstream into multiple segments delimited by the plurality of markers and a second means for processing configured to process a portion of the multiple segments and translate the portion of multiple segments into decoded data elements. The first means for processing processes the decoded data elements to generate the pixel data and further wherein the first means for processing and the second means for processing are configured to operate in parallel. Preferably, the second means for processing is configured to process variable-length data. In one embodiment, the second means for processing comprises a reduced instruction set computer. The coded bitstream is a compressed bitstream. Preferably, the compressed bitstream is encoded according to an MPEG standard. Preferably, the MPEG standard is the MPEG-4 standard. Alternatively, the compressed bitstream is encoded according to a JPEG standard. Alternatively, the compressed bitstream is encoded according to one of the H.261 standard and the H.263 standard. The markers are video object plane start codes indicating the start of a video object. The decoded data elements comprise macroblocks containing integers representing discrete cosine transform (DCT) coefficients of the pixel data. In a further embodiment, the first means for processing processes the data elements to generate pixel data comprises dequantizing the DCT coefficients to generate dequantized DCT coefficients and performing an inverse DCT transformation on the dequantized DCT coefficients to generate the pixel data. In a further embodiment, the data processing system further comprises an external memory configured to store a portion of the coded bitstream and a portion of the decoded data elements and a high-speed bus coupling the first means for processing and the second means for processing to the external memory. The first means for processing comprises a first cache. The second means for processing comprises a second cache.

In a further aspect of the present invention, a method of translating a coded bitstream delimited by a plurality of markers into pixel data suitable for rendering video images comprises dividing the coded bitstream into a plurality of blocks by a first processor, the plurality of blocks comprising compressed data elements delimited by the plurality of markers parsing in a first direction the compressed data elements by a second processor to translate the compressed data elements into decompressed data elements and generating the pixel data from the decompressed data elements by the first processor. The first processor and the second processor are configured to operate in parallel. In an alternate embodiment, the coded bitstream is coded according to a JPEG standard. In an alternate embodiment, the coded bitstream is coded according to one of the H.261 standard and the H.263 standard. Preferably, the coded bitstream is coded according to an MPEG standard. Preferably, the MPEG standard is MPEG-4. In a further embodiment, the compressed data elements are Huffman codes of integers representing discrete cosine transform (DCT) coefficients of a video image and the decompressed data elements are the corresponding integers representing discrete cosine transform coefficients of a video image. In a further embodiment, generating the pixel data from the decompressed data elements comprises dequantizing the DCT coefficients to produce dequantized DCT coefficients and performing an inverse DCT transformation on the dequantized DCT coefficients to generate the pixel data. Generating the pixel data from the compressed data elements further comprises performing motion compensation on the dequantized DCT coefficients to generate the pixel data. The first processor performs the step of dividing a coded bitstream representing a first video object while the second processor performs the step of translating the compressed data elements into decompressed data elements representing a second video object. When an error is encountered during the step of translating the decompressed data elements by a second processor, the second processor transmits an error message to the first processor. When the first processor receives an error message from the second processor, the first processor transmits a start recovery message to the second processor. When the second processor receives a start error recovery message from the first processor, the second processor performs an error recovery routine. For example, if the bitstream is encoded using a reversible Huffman table, the coded bitstream can be decoded using a reversible Huffman table. An error is encountered when an integer in the coded bitstream does not have a corresponding entry in a Huffman table, and further wherein the error recovery routine comprises sequentially parsing in a second direction the compressed data elements and translating the compressed data elements into decompressed data elements corresponding to entries in a reversible Huffman table, the second direction opposite to the first direction. In one embodiment, translating the compressed data elements comprises sequentially translating the compressed data elements into decompressed data elements using run-length decoding. In a further embodiment, translating the compressed data elements comprises sequentially translating the compressed data elements into decompressed data elements using arithmetic decoding. When the first processor receives an error signal from the second processor, the first processor replaces the data elements with data elements corresponding to a third video object different from the second video object. The coded bitstream is encoded as partitioned data. The markers are resynchronization markers. When the second processor encounters an error after parsing a first resynchronization marker, the second processor transmits an error signal to the first processor and continues translating from a second resynchronization marker.

In still a further aspect of the present invention, a compressed bitstream decoding system for translating a coded compressed bitstream delimited by a plurality of markers into pixel data suitable for rendering video images comprises a first processor configured to parse the coded compressed bitstream and divide the coded compressed bitstream into multiple segments delimited by the plurality of markers and a second processor configured to process a portion of the multiple segments and translate the portion of multiple segments into decoded data elements. The first processor processes the data elements to generate the pixel data and further wherein the first processor and the second processor are configured to operate in parallel. Preferably, the second processor is configured to process variable-length data. The second processor comprises a reduced instruction set computer. Preferably, the coded compressed bitstream is encoded according to an MPEG standard. Preferably, the MPEG standard is the MPEG-4 standard. Alternatively, the coded compressed bitstream is encoded according to a JPEG standard. Alternatively, the coded compressed bitstream is encoded according to one of the H.261 standard and the H.263 standard. The markers are video object plane start codes indicating the start of a video object. The decoded data elements comprise macroblocks containing integers representing discrete cosine transform (DCT) coefficients of the pixel data. In a further embodiment, the first processor processing the data elements to generate pixel data comprises dequantizing the DCT coefficients to generate dequantized DCT coefficients and performing an inverse DCT transformation on the dequantized DCT coefficients to generate the pixel data. In a further embodiment, the compressed bitstream decoding system further comprises an external memory configured to store a portion of the coded compressed bitstream and a portion of the decoded data elements and a high-speed bus coupling the first processor and the second processor to the external memory. The first processor comprises a first cache. The second processor comprises a second cache.

In a further aspect of the present invention, a data processing system for processing digital pixel data comprises an encoder for encoding the digital pixel data into a coded bistream comprising a plurality of segments delimited by markers, a decoder configured to receive the coded bitstream from the encoder, the decoder comprising a first processor configured to parse the coded bitstream and divide the coded bitstream into multiple segments delimited by the plurality of markers and a second processor configured to process a portion of the multiple segments and translate the portion of multiple segments into decoded data elements. The first processor processes the decoded data elements to generate the digital pixel data and the first processor and the second processor are configured to operate in parallel. Preferably, the second processor is configured to process variable-length data. The second processor comprises a reduced instruction set computer. Preferably, the compressed bitstream is encoded according to an MPEG standard. Preferably, the MPEG standard is the MPEG-4 standard. Alternatively, the compressed bitstream is encoded according to a JPEG standard. Alternatively, the compressed bitstream is encoded according to one of the H.261 standard and the H.263 standard. The markers are video object plane start codes indicating the start of a video object. The decoded data elements comprise macroblocks containing integers representing discrete cosine transform (DCT) coefficients of the pixel data. In a further embodiment, the first processor processing the data elements to generate pixel data comprises dequantizing the DCT coefficients to generate dequantized DCT coefficients and performing an inverse DCT transformation on the dequantized DCT coefficients to generate the pixel data. In a further embodiment, the data processing system further comprises an external memory configured to store a portion of the coded bitstream and a portion of the decoded data elements and a high-speed bus coupling the first processor and the second processor to the external memory. The first processor comprises a first cache. The second processor comprises a second cache. The data processing system further comprises a transmission medium coupling the encoder to the decoder. Preferably, the transmission medium comprises a network.

BRIEF DESCRIPTION OF THE DRAWINGS

FIG. 16 shows a reversible Huffman table.

FIGS. 17A-D illustrate an input frame buffer containing a coded video bitstream and pointers used to parse the coded video bitstream, at various stages, using the reversible Huffman table of FIG. 16.

FIGS. 18A-D illustrate an output frame buffer storing a decoded video data, corresponding to the parsed video bitstream of FIGS. 17A-D.

DETAILED DESCRIPTION OF THE PREFERRED EMBODIMENT

Figure 1:
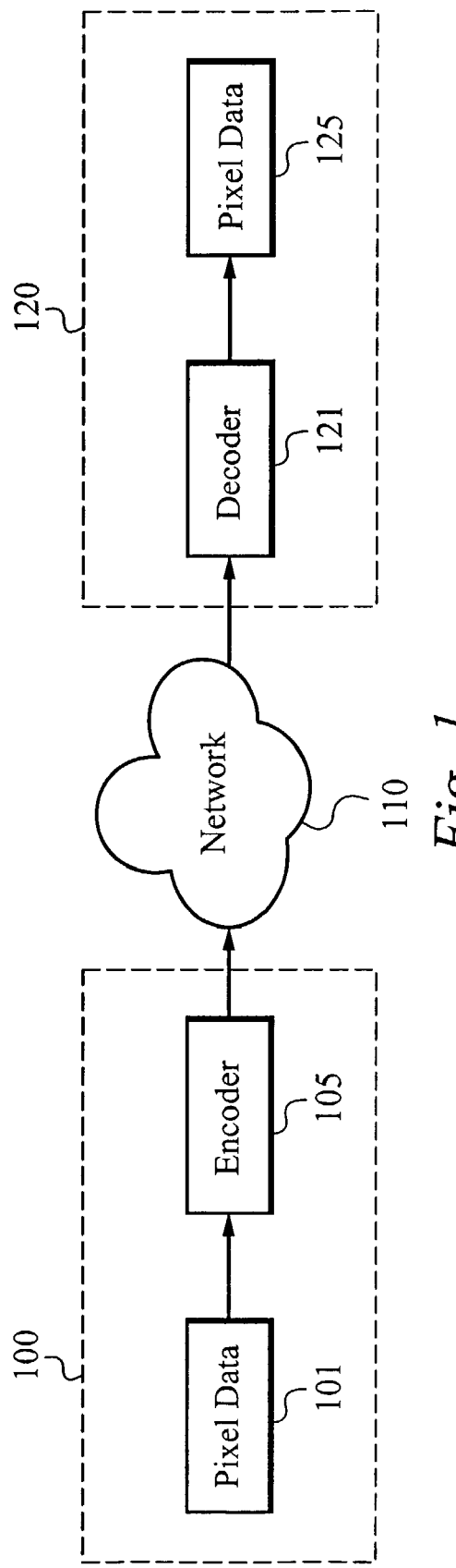
FIG. 1 is a high-level diagram of an encoder coupled by a network to a decoder, where the encoder encodes digital pixel data for transmission over the network and the destination decodes data to recover the digital pixel data.
Figure 2:
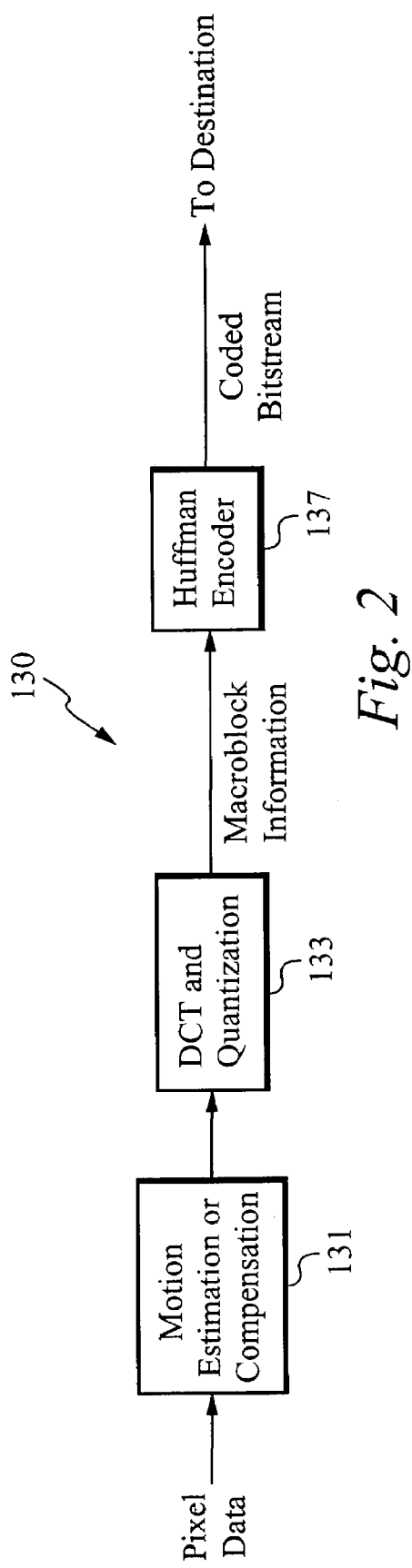
FIG. 2 is a more detailed view of the encoder illustrated in FIG. 1.
Figure 3:
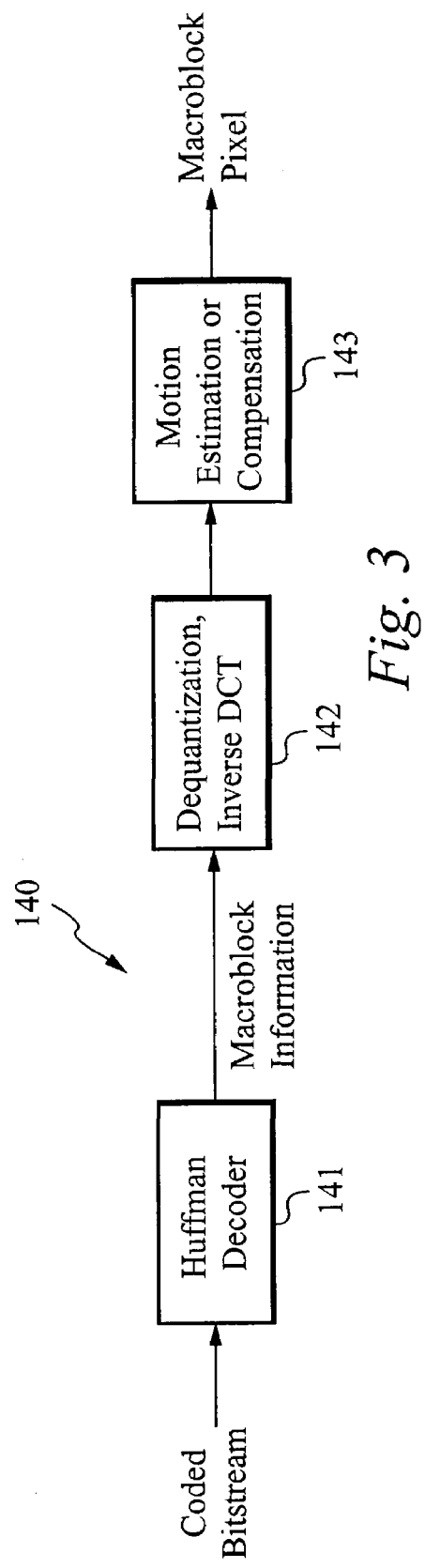
FIG. 3 is a more detailed view of the decoder illustrated in FIG. 1.
Figure 4:
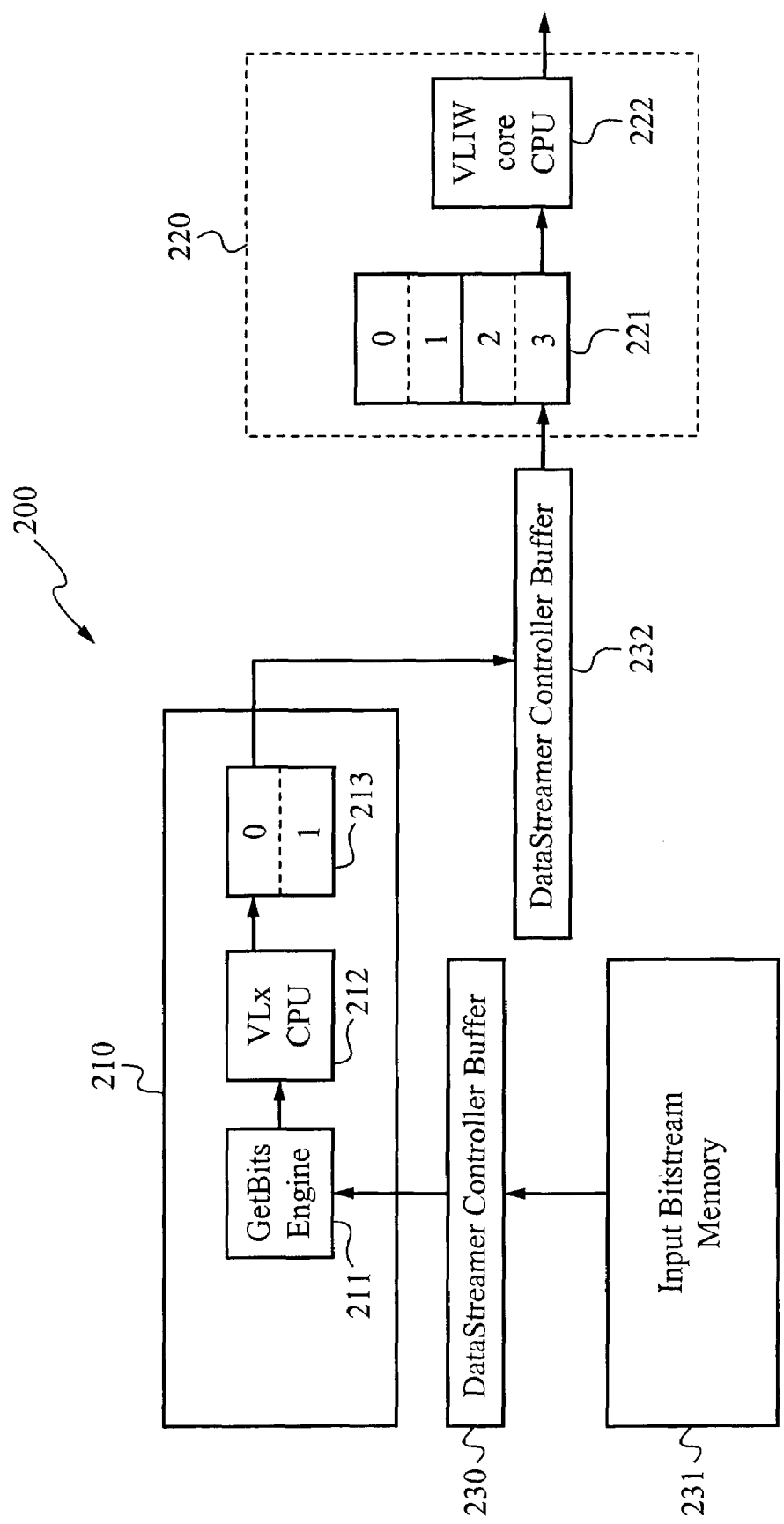
FIG. 4 shows a prior art decoder.
Figure 5:
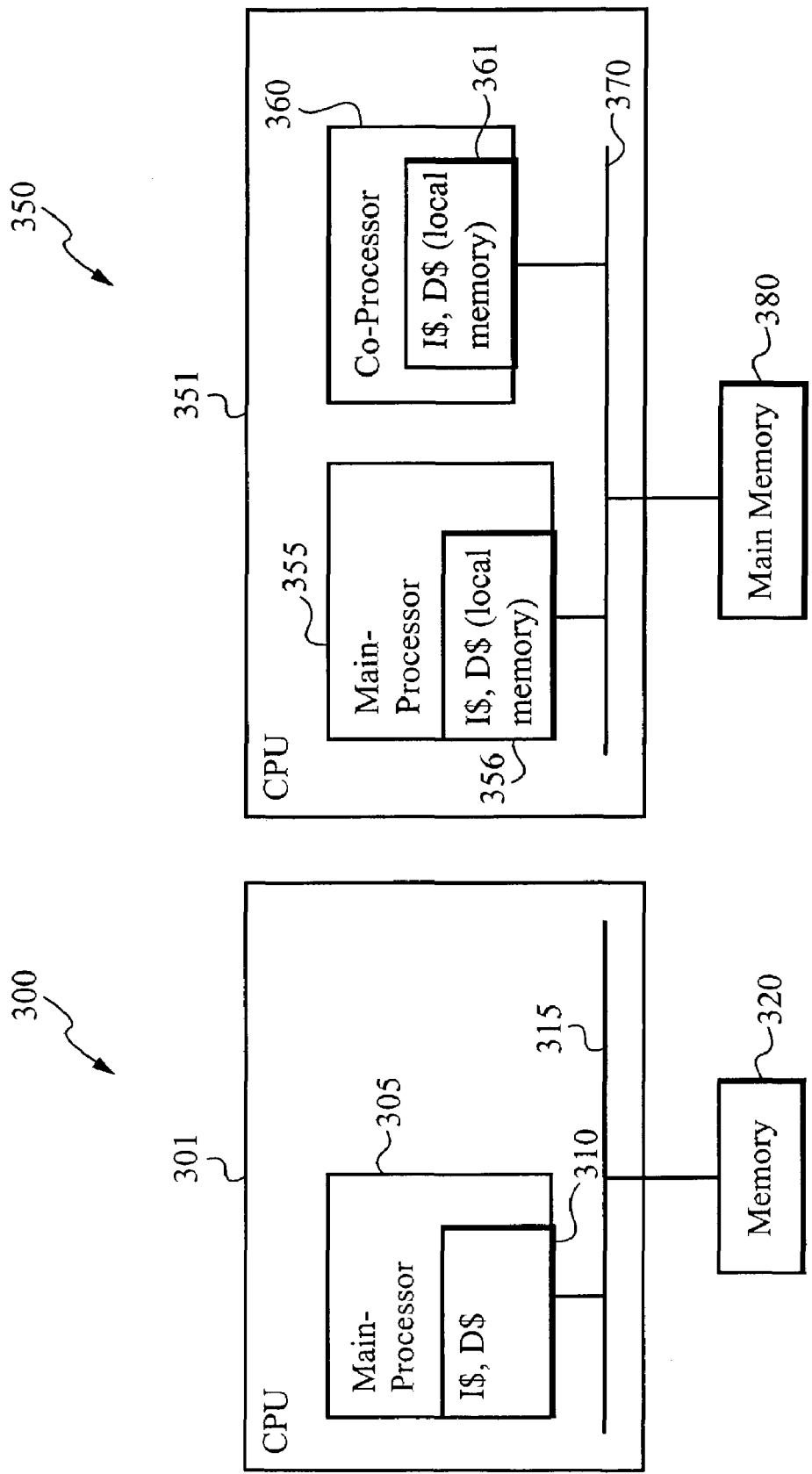
FIG. 5 shows a decoder in accordance with one embodiment of the present invention.

In accordance with the present invention, a decoder uses parallel processors to more efficiently decode a coded video bitstream. FIG. 5 shows an encoder 300 at a source and a decoder 350 at a destination. The encoder 300 and the decoder 350 are generally coupled by a network, such as the Internet.

As illustrated in FIG. 5, the encoder 300 comprises a CPU 301 coupled to an external memory 320 by a bus 315. The CPU comprises a main processor 305 which in turn comprises local memory 310. Preferably, the local memory 310 is a cache. The decoder 350 comprises a CPU 351 coupled to an external memory 380 by a bus 370. The CPU 351 comprises a main processor 355 and a co-processor 360. The main processor 355 comprises a first local memory 356. The co-processor 360 comprises a second local memory 361. The first local memory 356, the second local memory 361, and the external main memory 380 are coupled by the bus 370.

In operation, in one embodiment of the present invention, the encoder 300 retrieves video data in the form of digital pixel data from the external memory 320 and stores it in the local memory 310. The digital pixel data can be stored in the external memory 320 by the main processor 305, by an external memory controller, or by other means. The encoder 300 then compresses the digital pixel data and transmits the compressed digital pixel data to the decoder 350. In accordance with the present invention, video data can be compressed using lossy or lossless techniques. Lossless techniques include, but are not limited to, run-length compression, statistical compression, relative compression, or any other form of lossless compression. Statistical compression includes Huffman encoding and Lempel-Ziv coding. Preferably, the encoder uses Huffman encoding to compress video data. It will be appreciated that whatever form of compression the encoder 300 uses, the decoder 350 must perform the inverse to recover the compressed video data.

The decoder 350 first receives the compressed video data in the main memory 380 and then allocates tasks between the main processor 355 and the co-processor 360 to efficiently decode the coded video data and recover the digital pixel data. The compressed video data can be transferred from the main memory 380 to the local memory 356, where the main processor 355 can process it. Furthermore, pre-processed or post-processed video data can be transferred from the main memory 380 to the local memory 361, where the co-processor 360 can process it.

By allocating tasks between the main processor 355 and the co-processor 360, the decoder 350 allows for more efficient error recovery, as described in more detail below. For example, the main processor 355 can be used to quickly find the start markers of data elements, especially when the start markers are byte-aligned. The main processor 355 can also be used to access large amounts of complex data.

As described in more detail below, a decoder according to embodiments of the present invention efficiently apportions tasks between a main processor and a co-processor to recover the digital pixel data. For example, referring to FIG. 5, the main processor 355 can read a coded video bitstream stored in the external memory 380, store it in the local memory 356, and parse the coded video bitstream. The main processor 355 can parse header information related to the coded video bitstream and instruct the co-processor 360 to decode the coded video bitstream. While the co-processor 360 is decoding the coded video bitstream to recover macroblock information, the main processor 355 can process header information related to another frame. The main processor 355 can thus perform tasks in parallel with the co-processor 360. When the co-processor 360 has recovered macroblock information, the main processor can parse the recovered macroblock information and, as described below, reconstruct the digital pixel data. If the co-processor 360 encounters an error while decoding the coded video bitstream, it can signal the main processor 355, which can determine whether to execute an error recovery routine. By allocating tasks in this manner, the main processor 355 can be optimized to perform high-level tasks and the co-processor 360 can be optimized to perform low-level tasks, this increasing the overall efficiency of the decoder 350.

It will be appreciated that embodiments of the present invention can be used to decode data that has been encoded according to many standards, including, but bot limited to, MPEG-4, JPEG, JPEG2000, H.261, and H.263. Preferably, the video data has been encoded according to the MPEG-4 standard. The tasks performed by the main processor 355 and the co-processor 360 are better appreciated in light of the structure of video data under the MPEG-4 standard.

Figure 6:
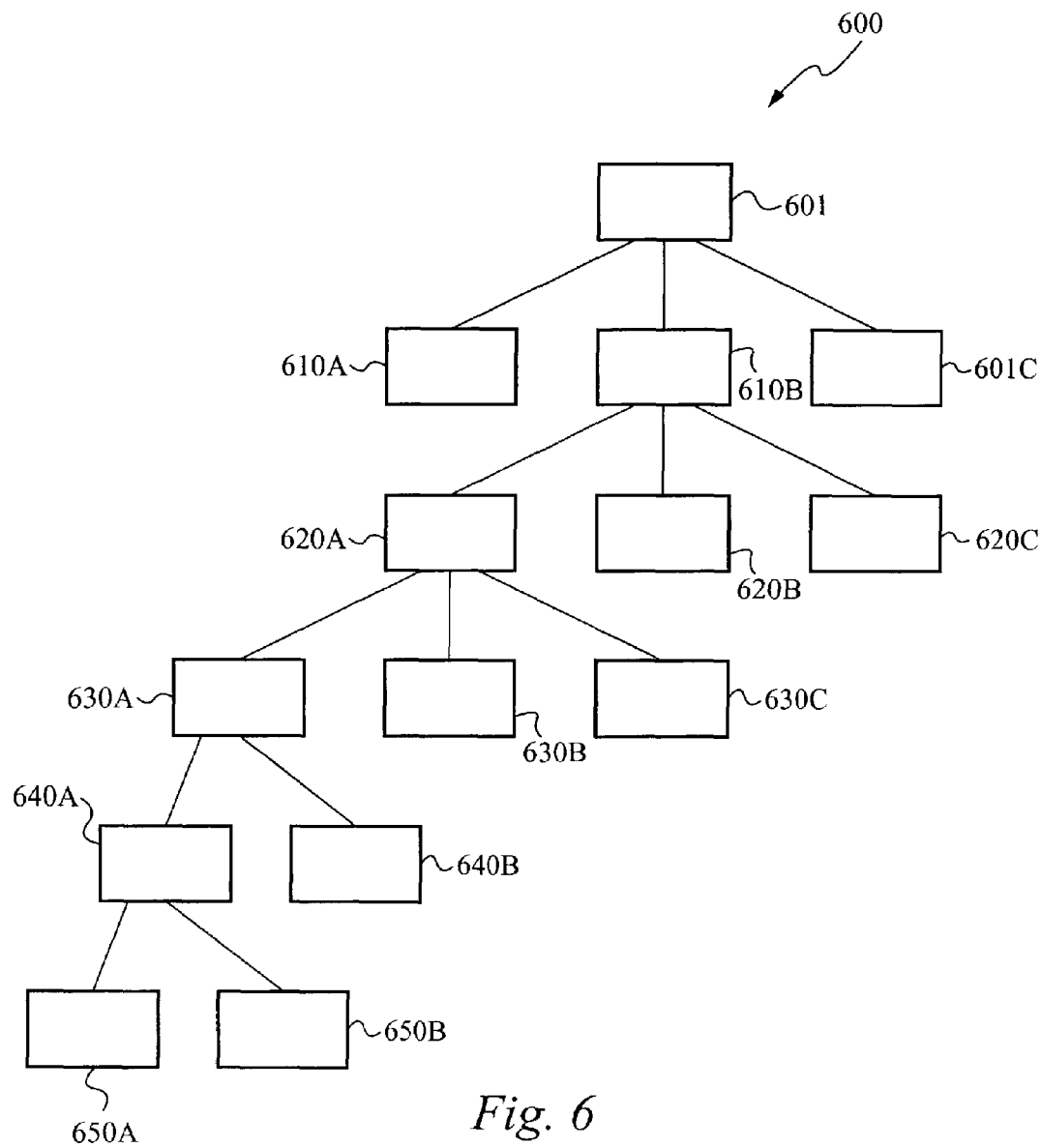
FIG. 6 is a hierarchical structure of video data in accordance with the MPEG-4 standard.

FIG. 6 shows the hierarchical structure 600 of coded visual data according to the MPEG-4 standard. As illustrated in FIG. 6, the top layer of coded visual data comprises a video session 601, which contains one or more video objects 610A-C. It will be appreciated that while FIG. 6 shows only three video objects 610A-C, a video session will typically contain many more video objects. Each video object can display a separate object in a scene, such as a person, a tree, a car, so that combining video objects produces a composite image.

Each video object 610A-C is comprised of a series of video object layers. For example, as illustrated in FIG. 6, the video object 610B comprises the video object layers 620A-C. Each video object layer contains information about the spatial and time resolutions of a video object. Each video object layer contains a series of group of video object planes. For example, the video object layer 620A contains the group of video object planes 630A-C. Each group of video object planes is a time sequence of video object planes. For example, the group of video object plane 630A contains the video object planes 640A-B. Each video object plane (VOP) is an instance of a video object at a given time, and can be one of several types of video objects, such as a I-VOP, a P-VOP, and a B-VOP. As explained in the standard document ISO/IEC 14496-2, a P-VOP, or predictive-coded VOP, is a VOP that applies motion compensation to a previous VOP to determine a current VOP. An I-VOP, or intra-coded VOP, uses information contained within itself to determine an image. A B-VOP, or bidirectional predictive-coded VOP, is a VOP that uses motion vectors and information from previous and future reference VOPs to determine a present VOP. Each video object plane contains macroblocks, which contain DCT coefficients and other information used to reconstruct a VOP. For example, the VOP 640A contains the macroblocks 650A-B. Each macroblock contains integers (bit strings) that represent luminance and chrominance data that define several pixels. It will be appreciated that although FIG. 6 shows the VOP 640A containing two macroblocks 650A and 650B, generally a VOP will contain many macroblocks.

Figures 7, 8:
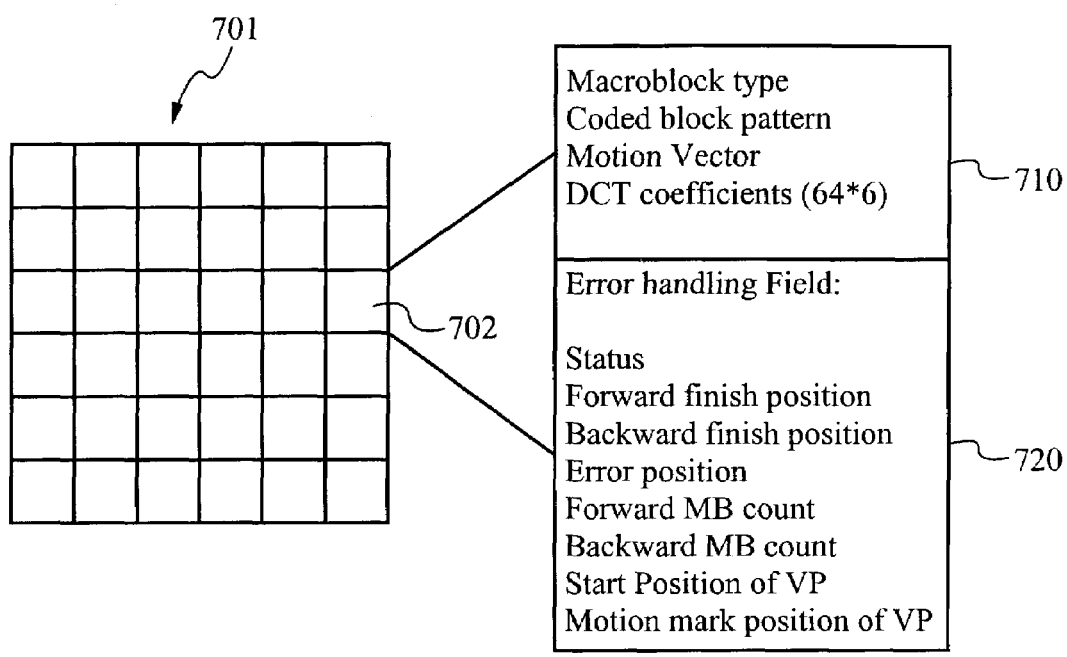
FIG. 7 shows a group of macroblocks containing information used to practice embodiments of the present invention.
FIG. 8 shows the structure of luminance and chrominance data stored in the macroblocks of FIG. 7.

FIG. 7 shows a group of macroblocks 701 containing DCT coefficients and other data used to reconstruct digital pixel data. As discussed above, an encoder reads the digital pixel data and generates macroblocks containing DCT coefficients from which the digital pixel data can be recovered. As illustrated in FIG. 7 and described in more detail below, each macroblock, such as a macroblock 702, contains information used to reconstruct an image contained in a portion of a frame. In addition to the DCT coefficients, each macroblock contains error recovery information that can be used to reconstruct a digital image even when the DCT coefficients are corrupted, for example, during transmission across a network.

As illustrated in FIG. 7, each macroblock, such as the macroblock 702, contains a data field 710 and an error-handling field 720. The data field 710 contains information describing the macroblock type, the coded block pattern, a motion vector, and the DCT coefficients that describe the luminance and chrominance values of each pixel. The macroblock type field contains a value indicating whether the macroblock contains data relating to a B-VOP, an I-VOP, or a P-VOP. The coded block pattern contains a value that indicates if additional information is contained in the macroblock that can be used for decoding. The motion vector field holds information used for predictive coding.

The error handling field 720 contains information useful for error recovery, including the following fields: STATUS, FORWARD_FINISH_POSITION, BACKWARD_FINISH_POSITION, ERROR_POSITION, FORWARD_MACROBLOCK_COUNT, BACKWARD_MACROBLOCK_COUNT, START_POSITION_OF_VP, and a MOTION_MARK_POSITION_OF_VP. Those fields relevant to embodiments of the present invention will be described in more detail below.

For example, as illustrated in FIG. 8, each macroblock consists of 4 blocks of luminance Y, one block of Cb chrominance, and one block of Cr chrominance, where each block is an 8×8 matrix. Thus, the DCT coefficients describing these blocks contain 64*8 bits.

In general, each data structure in the hierarchical structure illustrated in FIG. 6 contains a corresponding header, used to reconstruct the data in the data structure. Thus, for example, when multiple macroblocks are grouped together to form a video object plane, as illustrated in FIG. 6, each video object plane is delimited by a video object plane (VOP) header. The VOP header is generated by an encoder when creating a bitstream containing a video object plane. It will be appreciated that the VOP header contains information used to reconstruct data contained in a VOP.

As discussed in more detail below, a VOP can also contain resynchronization markers, used for error recovery. Resynchronization markers can be inserted into the coded video bitstream at pre-determined points to make the bitstream more resilient to error. A resynchronization marker provides the decoder with one method to recover from errors. When a decoder detects an error in a coded video bitstream, the decoder can jump to the next resynchronization marker and resume parsing from there. The resynchronization marker contains information that allows the decoder to perform differential decoding, even if the preceding data has been corrupted. Resynchronization markers thus delimit self-contained video information. The data contained between resynchronization markers are called video packets. A VOP containing a number of video packets is illustrated in FIG. 9.

Figure 9:
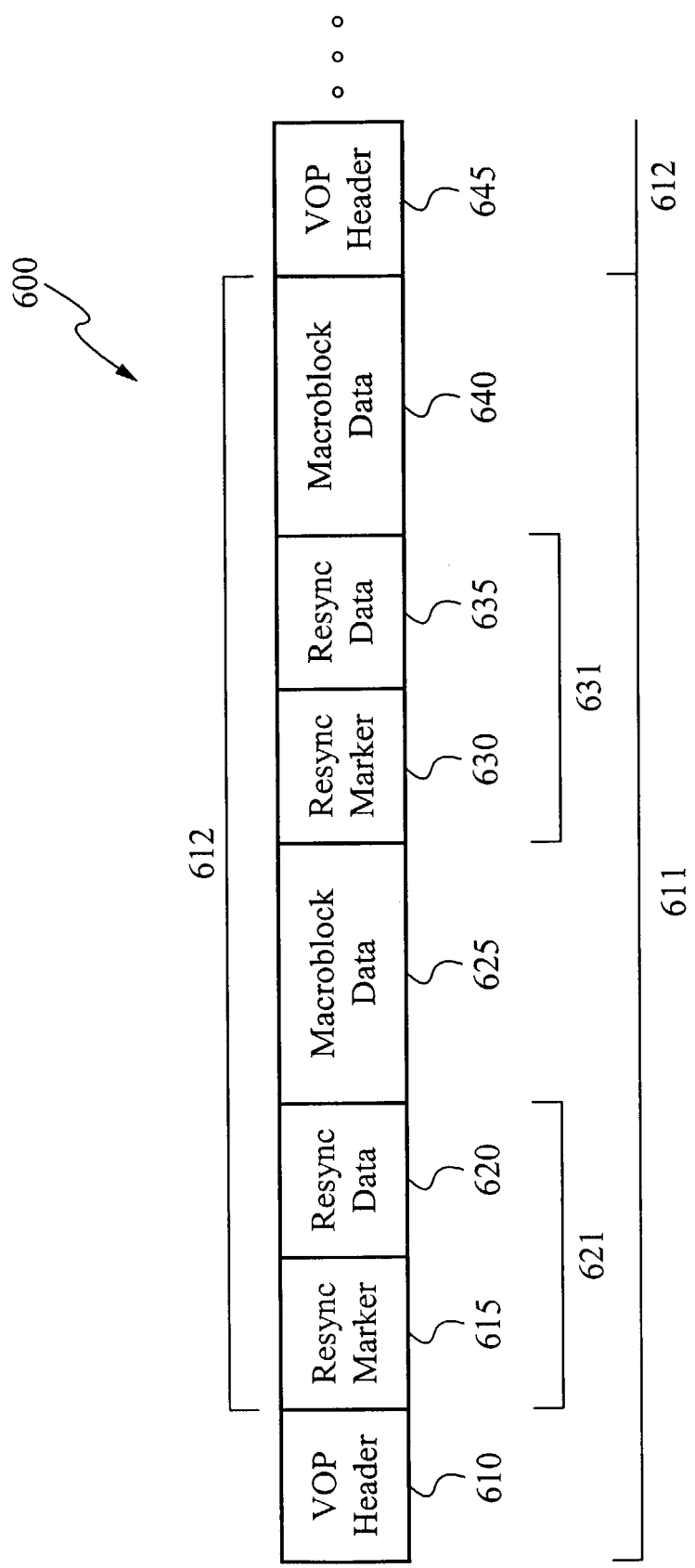
FIG. 9 is a diagram of a video object plane.

As illustrated in FIG. 9, a sequence of VOPs 600 contains a first VOP 611 and a second VOP 612. For ease of illustration, only a VOP header 645 of the second VOP 612 is shown. It will be appreciated that the second VOP 612 will also contain a video packet (not shown). The first VOP 611 contains a VOP header 610 followed by a video packet 612. The video packet 612 contains a resynchronization marker 615 and related resynchronization data 620. Collectively, the resynchronization marker 615 and the resynchronization data 620 are referred to as a video packet (VP) header 621. The resynchronization header 621 is followed by a first macroblock data 625. The first macroblock data 625 is followed by a second VP header 631, which comprises a second resynchronization marker 630 and second resynchronization data 635. The resynchronization markers 615 and 630 are unique bit codes that are distinguishable from the VOP header codes, macroblock data codes, etc. Generally, all resynchronization markers have the same value. Thus, the value of the first resynchronization marker 615 is equal to the value of the second resynchronization marker 630.

As will be described in more detail below, if the decoder encounters an error when decoding the first macroblock data 625, it jumps to the second VP header 631, which it recognizes by the unique resynchronization marker 630. The decoder then reads the second resynchronization data 635 so that it can properly decode the data in the second macroblock 640.

It will be appreciated that the VOP headers 610 and 645, the VP headers 621 and 631, and all the other data described herein are generated by an encoder for use by a decoder to recover coded video data.

Figure 10:
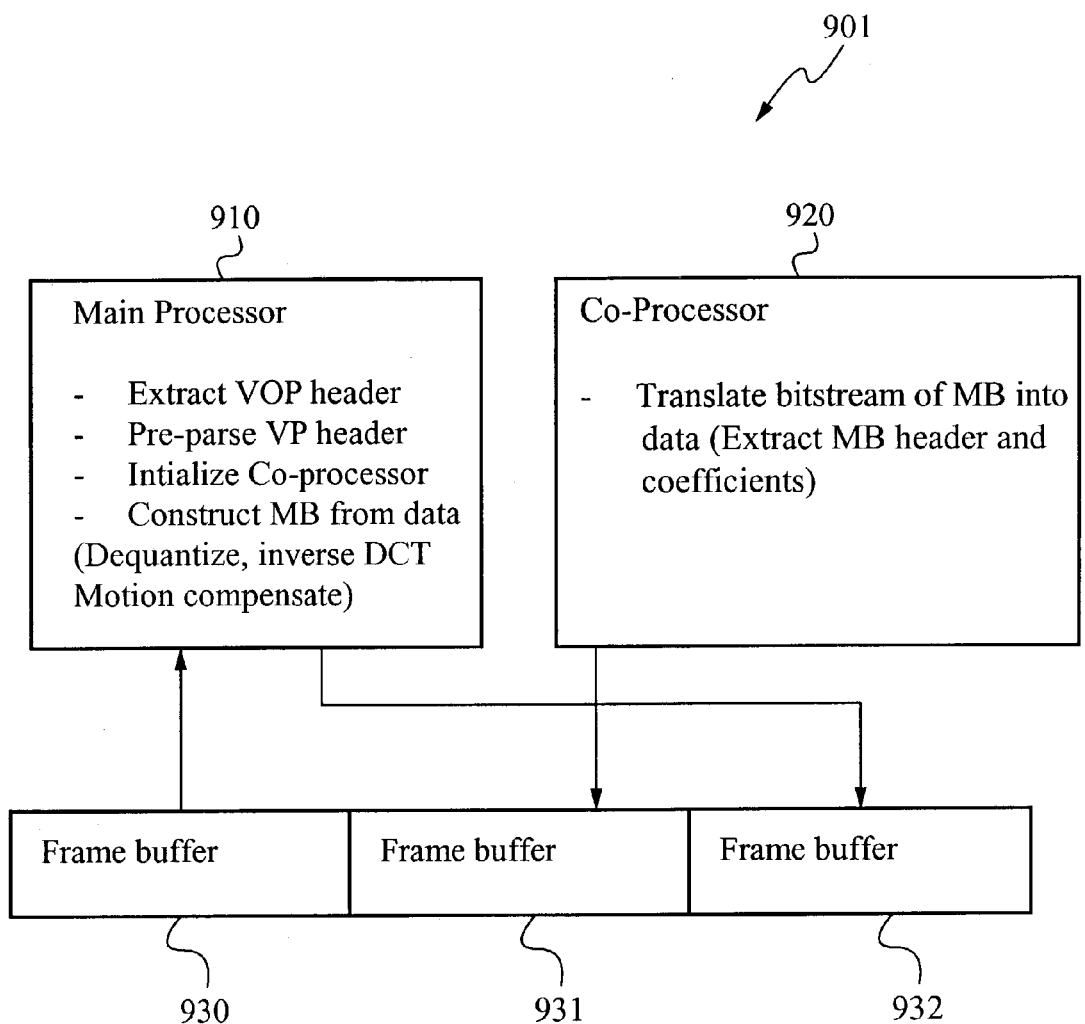
FIG. 10 shows how a main processor, a co-processor, and frame buffers function to decode coded video bitstreams in accordance with the present invention.

FIG. 10 is a high-level diagram of how a decoder 901 comprising a main processor 910 and a co-processor 920 functions to decode coded video pixel data in accordance with embodiments of the present invention. First, a coded video bitstream is stored in a first frame buffer 930. The coded video bitstream is generated by coding a video image at a source and transmitting the coded bitstream over a channel (not shown) to a destination containing the decoder 901. The channel can be a network, such as the Internet, a bus connecting a personal digital assistant to a personal computer, or any other medium for transmitting digital data from a source to a destination.

Next, the main processor 910 reads the coded video bitstream or a portion of the coded video bitstream from the first frame buffer 930 into its local memory (not shown) and then parses the coded video bitstream or a portion of the coded video bitstream. The main processor 910 extracts the VOP header from the coded video bitstream and pre-parses it, as described below. The main processor 910 then initializes the co-processor 920. The main processor 910 can initialize the co-processor 920 in many ways. For example, the main processor 910 can transmit to the co-processor 920 the following initialization data: (1) the starting address of the first frame buffer 930, where the coded video bitstream is stored, (2) the number of macroblocks in the coded video bitstream that must be decoded, (3) an address to store the decoded bitstream, or (4) other information necessary to decode the VOP. This initialization is transmitted from the main processor 910 to the co-processor 920 using shared memory, such as a frame buffer, using an identifiable data packet, or by other means.

The co-processor 920 next reads the coded video bitstream or a portion of it into its local memory (not shown). The co-processor 920 then parses the coded video bitstream, decodes the coded video bitstream to recover macroblocks, and stores the recovered macroblocks in a second frame buffer 931. The macroblocks contain data fields and error-handling fields, such as the data field 710 and the error handling field 720, both illustrated in FIG. 7. The main processor 910 parses the macroblocks, translates the information in the macroblocks into digital pixel data, and stores the digital pixel data in a third frame buffer 932. A display engine (not shown) can then read the digital pixel data in the third frame buffer 932 to render a video image or a series of video images on a PC monitor or an NTSC display monitor.

As described in more detail below, by apportioning the tasks between the main processor 910 and the co-processor 920, the main processor 910 can be used to efficiently perform high-level tasks, such as parsing header information, determining whether the co-processor 920 should perform error recovery, directing the co-processor 920 to perform error recovery routines, and reconstructing digital pixel data from macroblock data by performing dequantization and inverse DCT.

It will be appreciated that the frame buffers 930-932 can be directly coupled to the main processor 910, the co-processor 920, or both. Alternatively, the frame buffers 930-932 can be coupled to the main processor 910 and the co-processor 920 by a high-speed bus or by other means. It will also be appreciated that the main processor 910 and the co-processor 920 can each have local memory, such as cache memory.

It will also be appreciated that while FIG. 10 shows a main processor and only one co-processor, the decoder 901 of the present invention can also employ multiple co-processors in accordance with the present invention, each coordinated by receiving control information from the main processor 910.

Figure 11:
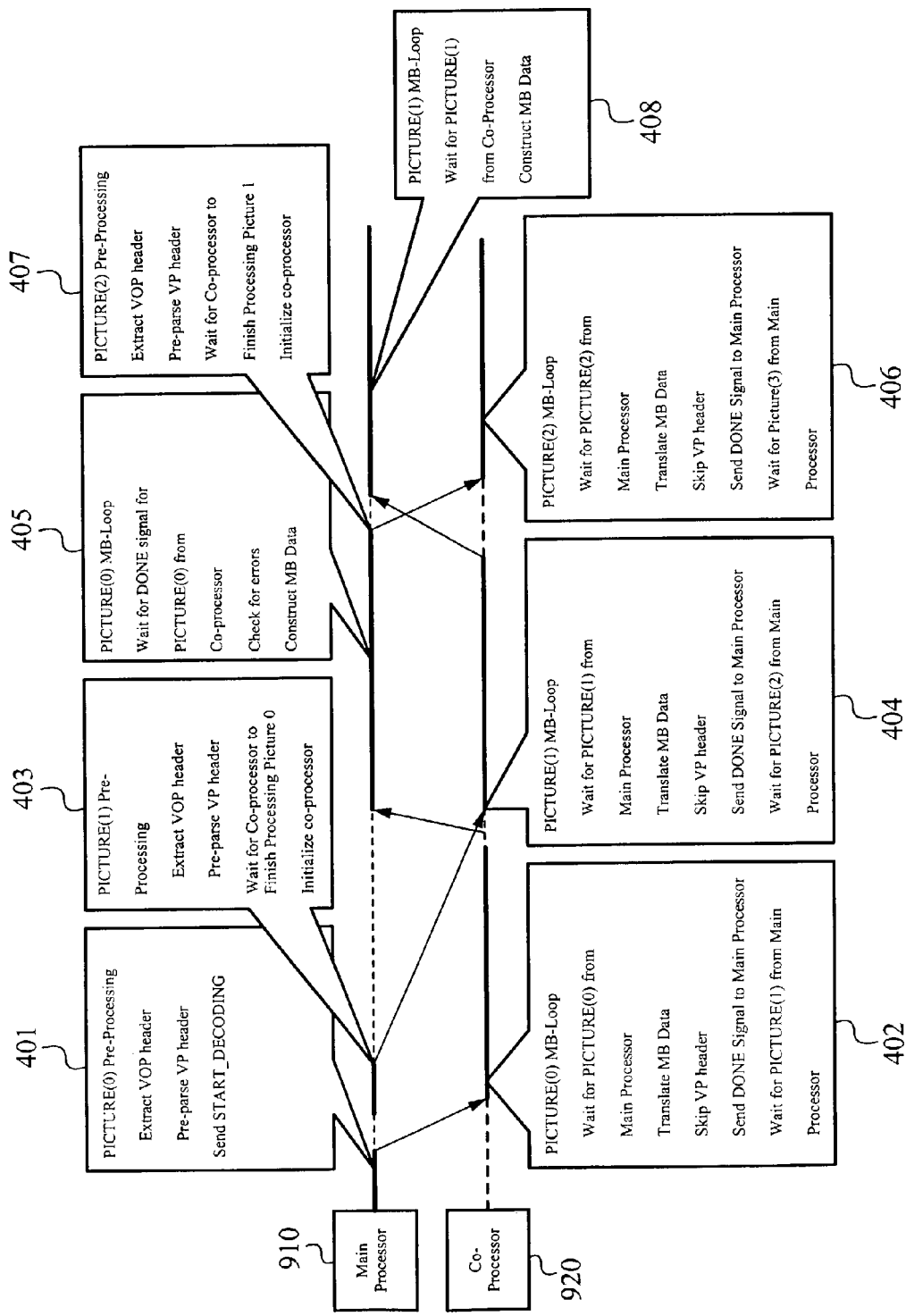
FIG. 11 is a timing diagram showing the functions performed by a main processor and a co-processor for decoding coded video bitstreams in accordance with the present invention.

FIG. 11 shows the tasks performed by the main processor 910 and the co-processor 920 depicted on a time line. FIG. 11 shows the processing of a video session containing the three sequential video object planes, Pictures 0-2. First, as illustrated in the processing block 401, the main processor 910 pre-parses a coded video bitstream corresponding to the Picture 0. In accordance with one embodiment of the present invention, the coded video bitstream contains macroblock data compressed using Huffman encoding, in accordance with the MPEG-4 standard. The main processor 910 first extracts the VOP header and the VP header in the coded video bistream. The main processor 910 then sends a START_DECODING message to the co-processor 920, signaling the co-processor 920 that a coded video bitstream is ready to be decoded. The main processor 910 can send a START_DECODING message to the co-processor 920 by, for example, putting a signal on the co-processor's 920 interrupt line, writing to a shared memory location, raising a signal on a direct-memory access controller, or by other means. As will be described in more detail below, the main processor 910 can send other information to the co-processor 920, such as the location in memory where the coded video bitstream is stored or other information necessary to decode a VOP. It will be appreciated that the location of the coded video bitstream in memory can be predetermined so that the main processor 910 does not have to transmit the location to the co-processor 920.

Once the main processor 910 has signaled the co-processor 920 that a coded video bitstream is ready to be decoded, the main processor 910 can process another VOP, Picture 1. The main processor 910 can thus process header information in Picture 1 while the co-processor 920 decompresses the coded video bitstream of Picture 0. The main processor 910 and the co-processor 920 can thus perform tasks in parallel, decreasing the time required to process and thus display video images.

Initially, the co-processor 920 performs the functions in the processing block 402. The co-processor 920 loops in a macroblock (MB) loop. First, the co-processor 920 waits for a START_DECODING message from the main processor 910. Preferably, the co-processor 920 executes a loop, periodically checking a segment of shared memory for a signal from the main processor 910 that a coded video bitstream is ready to be decoded. Alternatively, the co-processor 920 can sleep, to be woken when it receives an interrupt signal from the main processor 910.

Next, the co-processor 920 receives an address in memory from the main processor 910, indicating where in shared memory the coded video bitstream is stored. The co-processor 920 decodes the coded video bitstream by decompressing it to retrieve macroblocks and storing the macroblocks in a memory location accessible by the main processor 910. The co-processor 920 next skips the VP header, sends a DONE message to the main processor 910, and loops back to the start of its MB loop to wait for a signal from the main processor 910 to start decoding the next picture, Picture 1. The co-processor 920 can send a DONE message to the main processor 910 by setting an interrupt line of the main processor 910, by writing a predefined code word to a memory location shared by the main processor 910 and the co-processor 920, or by using other means.

It will be appreciated that the co-processor 920 can start executing the tasks in the processing block 402 before the main processor 910 begins executing tasks in the processing block 401. However, the co-processor 920 will loop until it receives a start signal from the main processor 910.

After the main processor 910 has completed the processing block 401, it executes the tasks in the processing block 403. In the processing block 403, the main processor 910 pre-parses the coded video bitstream for Picture 1 by extracting the VOP header and pre-parsing the VP header for Picture 1. The main processor 910 then waits until it receives a DONE signal from the co-processor 920, indicating that the co-processor 920 has finished decoding the coded video bitstream for Picture 0. When the co-processor 920 has finished decoding the coded video bitstream related to Picture 0, the main processor 910 initializes the co-processor 920 and sends a START_DECODING message to the co-processor 920. The main processor 910 initializes the co-processor 920 by setting a new starting address where the coded video bitstream for Picture 1 is stored in memory (if the location has changed), or by initializing other values sent to the co-processor 920 and used to decode a coded video bitstream related to the Picture 1.

When the co-processor 920 receives the START_DECODING message from the main processor 910, it performs the tasks listed in the processing block 404. The tasks listed in processing block 404 are similar to those listed in the processing block 402 and will not be described here.

After the main processor 910 has performed the tasks listed in the processing block 403, it next executes the tasks listed in the processing block 405. In the processing block 405, the main processor 910 waits for a DONE message from the co-processor 920. Additionally, the main processor 910 receives from the co-processor 920 the number of the picture that was decoded and, within the decoded macroblocks, any error status. Error status is returned to the main processor by setting a value, for example the STATUS flag in the error field 720 in FIG. 7. If the STATUS flag is set, indicating that the co-processor 920 encountered errors when decoding the coded video bitstream, the main processor 910 performs error recovery routines, as described in more detail below. The main processor 910 can, for example, instruct the co-processor 920 to perform error recovery routines in accordance with the MPEG-4 standard. If the error flag is not set, the main processor 910 will parse the macroblock data and recover the digital pixel data from it. In a preferred embodiment, the main processor 910 does this by dequantizing the DCT coefficients contained in a macroblock, performing inverse DCT transforms on the dequantized DCT coefficients to retrieve VOPs, and using motion vectors to retrieve B-VOPs and P-VOPs. After generating the digital pixel data and storing it in shared memory, such as the frame buffer 932 in FIG. 10, memory, the main processor 910 can then signal a display engine to display recovered video images determined by the digital pixel data.

After executing the tasks in the processing block 405, the main processor 910 executes the tasks in the processing blocks 407 and 408. Within the processing block 407, the main processor 910 pre-processes Picture 2. The processing block 407 is similar to the processing block 403 and will not be described here. After the main processor 910 has executed the tasks in the processing block 407, it executes the tasks in the processing block 408 to generate digital pixel data for Picture 1. The processing block 408 is similar to the processing block 405 and will not be described here.

After executing the tasks in the processing block 402, the co-processor 920 executes the tasks in the processing blocks 404 and 406. Within the processing block 404, the co-processor 920 decodes the coded video bitstream related to the Picture 1. Within the processing block 406, the co-processor 920 decodes the coded video bitstream related to the Picture 2. The processing blocks 404 and 406 are similar to the processing block 402 and will not be described here.

The tasks executed by the main processor 910 in the processing blocks 401, 403, 405, 407, and 408 are performed in parallel with the tasks executed by the co-processor 920 in the processing blocks 402, 404, and 406. In this way, video object planes that form a video session are generated quickly and efficiently.

Figure 12:
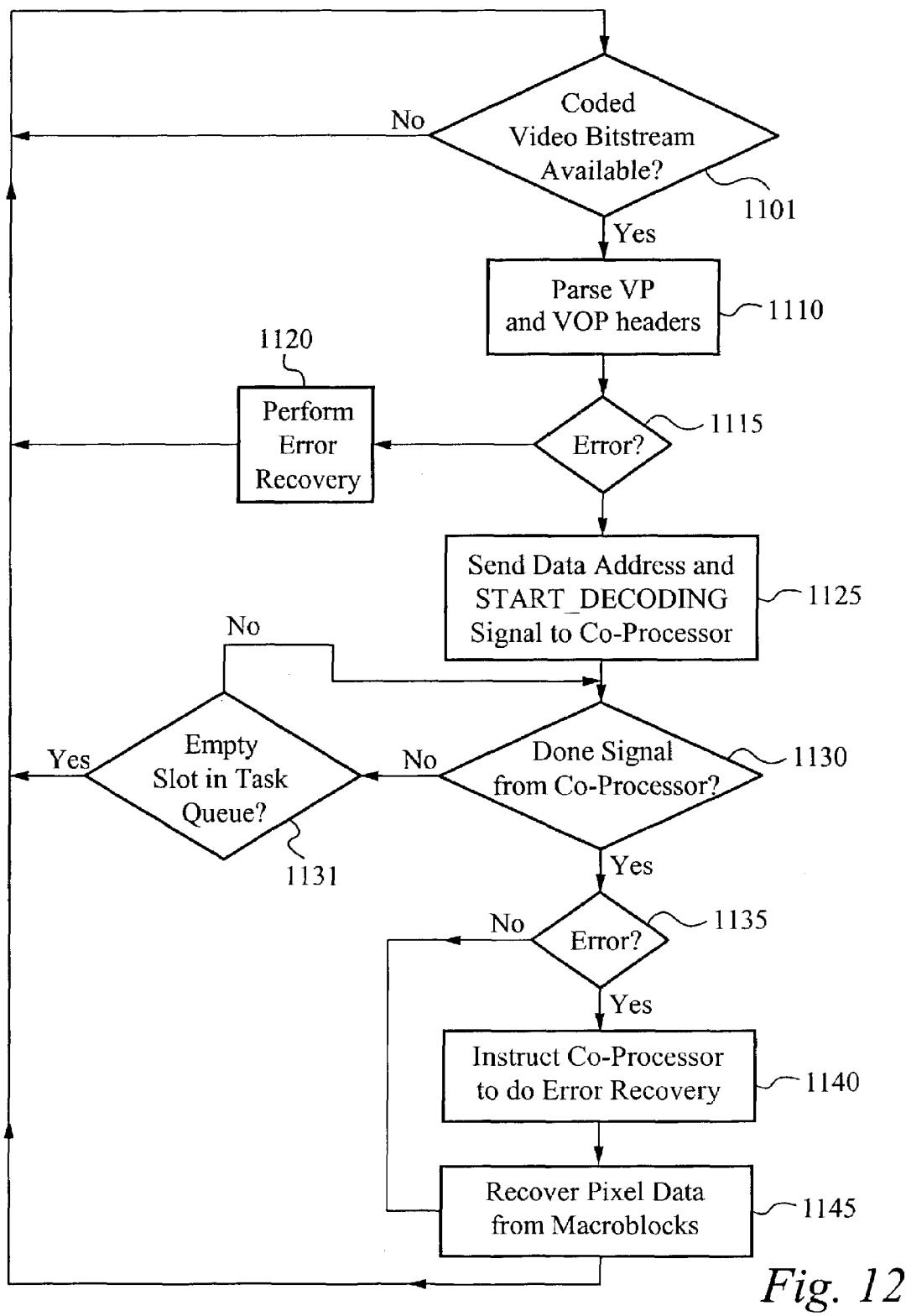
FIG. 12 is a flow chart indicating the steps performed by a main processor in accordance with embodiments of the present invention.

FIG. 12 is a flow chart depicting, in more detail, the steps performed by the main processor 910. As illustrated in FIG. 12, in the step 1101 the main processor 910 first waits until a coded video bitstream is available for processing. The main processor 910 can, for example, sleep until an external device, such as a direct memory access controller (not shown), signals it that a coded video bitstream is available for processing. The main processor 910 then awakens and processes the coded video bitstream, as described below. Alternatively, the main processor 910 periodically reads a shared memory location that stores a variable indicating that a coded video bitstream is available for processing. It will be appreciated that the main processor 910 can wait for a coded video bitstream to become available for processing in other ways in accordance with the present invention.

Next, in the step 1110, the main processor 910 parses the coded video bitstream for a VOP header and a VP header. It will be appreciated that the main processor 910 could also parse the coded video bitstream for markers other than the VOP header and the VP header. Next, in the step 1115, the main processor 910 checks that no errors have been encountered while parsing the VOP header or the VP header. An error can occur, for example, if the main processor 910 cannot detect a VOP header. It will be appreciated that a VP header is optional and need not be found in a coded video bitstream. A VP header will not be part of a coded video bitstream when the coded video bitstream comprises a single video packet.

If the main processor 910 detects an error while parsing the VOP header and the optional VP header, it proceeds to the step 1120, where it performs an error recovery routine. The error recovery routine can include, for example, discarding the entire corrupted VOP. If the main processor 910 does not encounter an error when parsing the VOP header and the optional VP header, it proceeds to the step 1125. In the step 1125, the main processor 910 sends a START_DECODING message to the co-processor 920. Additionally, the main processor 910 sends to the co-processor 920 an address indicating the location in memory where the coded video bitstream is stored. Alternatively, if the coded video bitstream has been divided into data segments, the main processor 910 sends to the co-processor 920 multiple addresses indicating the locations in memory where the data segments containing the coded video bitstream are stored.

Next, in the step 1130, the main processor 910 checks to see whether the co-processor 920 has sent a DONE message, indicating that the co-processor 920 has finished decoding a coded video bitstream for a previous picture. If the co-processor 920 has not sent the main processor 910 a DONE message, the main processor 910 enters the step 1131. In the step 1131, the main processor 910 checks a task queue in the co-processor 920 to determine whether co-processor can process another VOP. The co-processor 920 can process another VOP if, for example, the task queue has an empty slot available, which can be used to process another VOP. If an empty slot is available, the main processor 910 enters the step 1101. If an empty slot is not available, the main processor 910 enters the step 1130. If the co-processor 920 has sent the main processor 910 a DONE message, the main processor 910 enters the step 1135 and checks to see whether the co-processor 920 encountered an error while recovering macroblocks from a coded video bitstream. If the co-processor 920 encountered an error, the main processor 910 will perform the step 1140 and instruct the co-processor 920 to perform an error recovery routine, as described in detail below; the main processor 910 will then perform the step 1145 and recover the digital pixel data from the macroblock data by, for example, performing dequantization, inverse DCT, and other steps known to those skilled in the art. If the co-processor 920 determines in the step 1135 that it encountered no errors while recovering the macroblocks, the main processor 910 will proceed to the step 1145. After the step 1145, the main processor 910 will loop back to the step 1101.

The steps 1101, 1110, 1115, 1120, and 1125 in FIG. 12 correspond to the processing block 401 in FIG. 11. The steps 1130, 1135, 1140, and 1145 in FIG. 12 correspond to the processing block 405 in FIG. 11.

The decoding process performed by the co-processor 920 is better understood by referring to FIGS. 13, 14A-D, and 15A-D. FIGS. 13, 14A-D, and 15A-D illustrate how a coded video bitstream, containing a sequence of symbols, is decoded to recover the corresponding characters. As discussed above, an encoder translates the macroblock data in the form of characters and translates them into a sequence of shorter-length symbols. Thus, integers (characters) corresponding to the DCT coefficients are translated into symbols by the encoder. A decoder will receive this sequence of symbols and translate them back into the characters corresponding to the DCT coefficients. In a preferred embodiment, the characters are translated into symbols using Huffman encoding. It will be appreciated that in accordance with the present invention, characters are translated into symbols using other encoding methods including run-length encoding, Lempel-Ziv coding, relative compression, and other methods.

Figure 13:
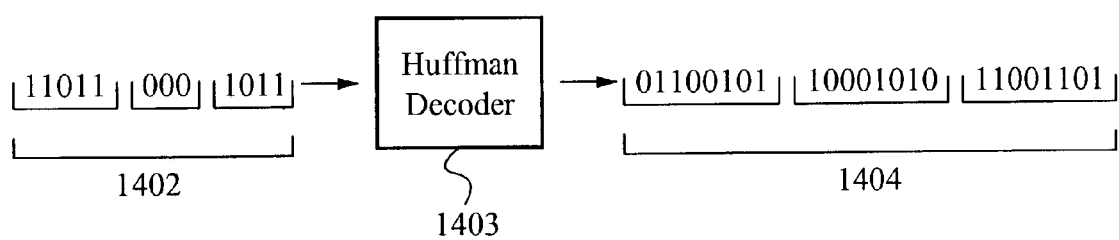
FIG. 13 shows a Huffman table, a coded video bitstream, a Huffman decoder using the Huffman table, and decoded video data generated when the coded video bitstream is input to the Huffman table.

FIG. 13 illustrates a Huffman Table 1401, a coded video bitstream 1402, a Huffman decoder 1403 based on the Huffman Table 1401, and a decoded video bitstream 1404 generated when the coded video bitstream 1402 is input to the Huffman decoder 1403. FIG. 13 illustrates that when a coded video bitstream 11011 000 1011 (e.g., sequence of symbols) is translated by the Huffman decoder 1403, the output video bitstream 01100101 10001010 11001101 is generated. It will be appreciated that spaces in the coded video bitstream are included for readability and are not part of the bitstream. The decoded video bitstream (e.g., sequence of characters) 01100101 10001010 11001101 can, for example, correspond to DCT coefficients corresponding the digital pixel data. Generally, the decoded video bitstream comprises a sequence of integers, each having a fixed number of bits. Here, the bit string 11011 is a symbol and the bit string 01100101 is its corresponding character. It will be appreciated that a Huffman decoder receiving the character 01100101, corresponding to a DCT coefficient or macroblock header information, will translate the character into the shorter symbol 11011 for compression and later transmission across a network. The decoder performs the inverse operation to recover the character and thus the corresponding DCT coefficient.

Figure 14A:
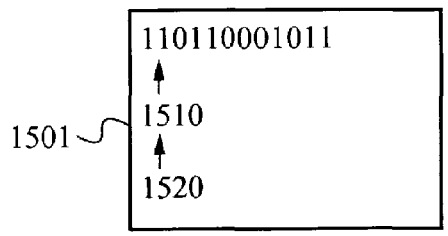
FIGS. 14A-D illustrate an input frame buffer containing the coded video bitstream of FIG. 13 and pointers used to parse the coded video bitstream, at various stages, using the Huffman table of FIG. 13.

FIGS. 14A-D show an input frame buffer 1501 and FIGS. 15A-D show a target frame buffer 1550 at various stages of the decoding process. The input frame buffer 1501 is used to store a coded video bitstream (e.g., sequence of symbols) and the target frame buffer 1550 is used to store the corresponding decoded video bitstream (e.g., sequence of characters). FIG. 14A illustrates the input frame buffer 1501 after a coded video bitstream has been stored in it. The Huffman decoder (1403, FIG. 13) within the co-processor 920 begins parsing the coded video bitstream at the left-most bit. A starting pointer 1510 is anchored at the left-most bit and an ending pointer 1520 is set to the address of the starting pointer 1510 and incremented until the bit string delimited by the starting pointer 1510 and the ending pointer 1520 matches an entry (symbol) in the Huffman table 1401 (FIG. 13). When a match is found, the character in the Huffman table 1401 corresponding to the matched symbol is written to the target frame buffer 1550. When a match occurs, the starting pointer 1510 and the ending pointer 1520 are both moved to one position past the current position of the ending pointer 1520. This continues until the entire coded video bitstream in the input frame buffer 1501 has been decoded or until an error is encountered.

Figure 15A:
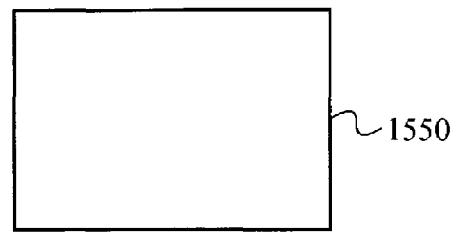
FIGS. 15A-D illustrate an output frame buffer storing decoded video data, corresponding to the parsed video bitstream of FIGS. 14A-D.

FIGS. 14A and 15A depict the input frame buffer 1501 and the target frame buffer 1550, respectively, after a coded video bitstream has been written to the input frame buffer 1501 and before the coded video bitstream has been decoded. FIG. 14A also shows the initial positions of the starting pointer 1510 and the ending pointer 1520. The coded video bitstream delimited by the starting pointer 1510 and the ending pointer 1520 is the single bit '1', which has no entry in the Huffman table 1401; the ending pointer 1520 is now incremented until the starting pointer 1510 and the ending pointer 1520 delimit a bit string (symbol) having a corresponding entry (character) in the Huffman table 1401.

Figure 14B:
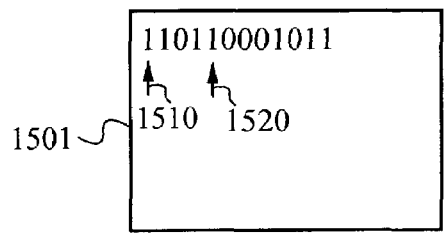
Figure 15B:
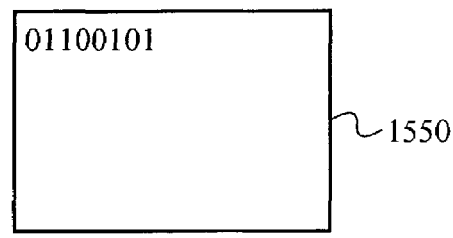
Figure 14C:
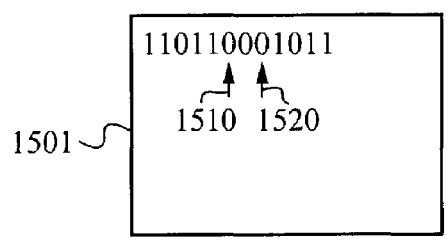
Figure 15C:
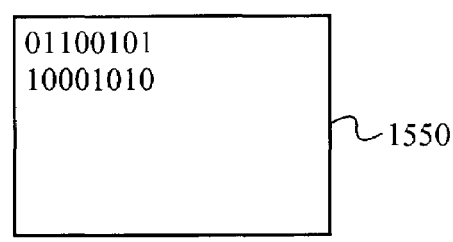
Figure 14D:
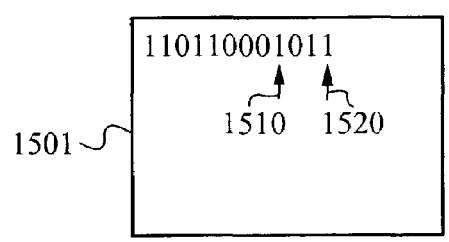
Figure 15D:
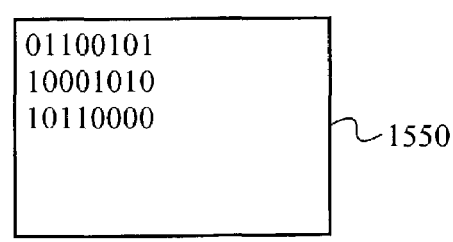

FIG. 14B illustrates the input frame buffer 1501 after the ending pointer 1520 has been incremented three times so that the starting pointer 1501 and the ending pointer 1520 delimit the bit string (symbol) 11011, which has an entry (character), 01100101, in the Huffman table 1401. The corresponding character is written to the target frame buffer 1550, as shown in FIG. 15B. The starting pointer 1510 and the ending pointer 1520 are now both moved one position past the location of the current position of the ending pointer 1520. FIGS. 14C and 15C show the input frame buffer 1501 and the target frame buffer 1550, respectively, after a second match has been made. FIGS. 14D and 15D show the input frame buffer 1501 and the target frame buffer 1550, respectively, after a third match has been made.

After the coded video bitstream has been decoded and the decoded bitstream stored in the target frame buffer 1550, a co-processor, such as the co-processor 920 in FIG. 10, will send a DONE signal to a main processor, such as the main processor 910 in FIG. 10, passing the main processor 910 the starting address of the target frame buffer 1550. The main processor 920 will then perform dequantization, inverse DCT transformations, and motion compensation on the characters in the decoded bitstream corresponding to macroblocks to recover the digital pixel data used to render images.

While parsing coded video bitstreams, the co-processor 920 can encounter a number of errors. For example, the co-processor 920 can encounter symbols that have no corresponding characters in the Huffman table. In accordance with embodiments of the present invention, the co-processor 920 can recover from errors in a number of ways. The co-processor 920 can recover from errors using (1) reverse variable-length codes (RVLCs), (2) resynchronization codes, and (3) data partitioning, each of which is described in more detail below.

When a decoder cannot translate symbols back into characters while parsing a bitstream in one direction, the decoder begins parsing the bitstream from a second direction. Because errors are generally bursty, the coded bitstream will generally not contain corrupted data in both ends of a frame buffer. RVLCs use reverse look-up tables, which map reverse symbols (corresponding to parsing a data buffer backwards) to characters.

FIG. 16 shows a reversible Huffman table 1700 used to illustrate one embodiment of the present invention. FIGS. 17A-D illustrate an input frame buffer 1701 containing a corrupted coded video bitstream, a starting pointer 1710, and an ending pointer 1720, all at various stages in a decoding process. FIGS. 18A-D show a target frame buffer 1750 at stages corresponding to those depicted in FIGS. 17A-D, respectively.

As illustrated in FIG. 17A, the starting pointer 1710 and the ending pointer 1720 are both positioned at the first bit in the coded video bitstream 111110001011. The ending pointer 1720 is incremented until the Huffman decoder (1403, FIG. 13) finds a matching entry in the Huffman table 1401 of FIG. 13. Here, the decoder does not find a matching entry, indicating a corrupted coded video bitstream. In accordance with one embodiment of the present invention, the co-processor alerts the main processor that an error has occurred. The starting pointer is stored in a variable FORWARD_FINISH_POSITION, such as in the error handling field 720 of FIG. 7. The main processor then calls the co-processor to begin reverse decoding using a reversible Huffman table. The co-processor will then load the last macroblock header from main memory, marked by a resynchronization code, into the co-processor's local memory. The co-processor then starts decoding from the last macroblock in the VP and continues decoding until it hits a mark position, which delimits digital pixel information from motion vector information. The co-processor now begins parsing from an opposite end of the corrupted coded video bitstream using the reversible Huffman table 1700, as discussed below.

The co-processor first sets the starting pointer 1710 and the sending pointer 1720 to the last bit in the corrupted coded video bitstream in the input frame buffer 1701. The ending pointer 1720 is then decremented while the bit string between the starting pointer 1710 and the ending pointer 1720 is compared to symbols in the reversible Huffman table 1700. FIG. 17B illustrates the input frame buffer 1701, the starting pointer 1710 and the ending pointer 1720 after a first match has been found. The delimited symbol, reading from left to right (i.e., in reverse), is the bit string 1101, which has the corresponding character 11001101. The corresponding character 11001101 is stored in the target frame buffer 1750, as shown in FIG. 18B. FIG. 17C shows the input frame buffer 1701, the starting pointer 1710, and the ending pointer 1720 after the decoder continues parsing from right to left to find the second match (symbol) having the bit string 000. The symbol 000 has a corresponding character 10001010, which is also written to the target frame buffer 1750. It will be appreciated that because the decoding is proceeding in a reverse direction, the decoded character data is written in reverse sequence (e.g., from high to low memory) in the target frame buffer 1750. FIG. 17D shows the input frame buffer 1701 after the second match. After the second match, it will be appreciated that the starting pointer 1710 and the ending pointer 1720 will no longer delimit a symbol within the reversible Huffman table 1700 of FIG. 16. Thus, the corresponding character in the target frame buffer 19D can be filled with characters indicating an error. The position of the starting pointer 1710 will be stored in the variable BACKWARD_FINISH_POSITION in an error handing field, such as the error handling field 720 of FIG. 7.

The variables FORWARD_FINISH_POSITION and BACKWARD_FINISH_POSITION are used by a main processor to determine which portions of a macroblock are corrupted and must be predicted using motion compensation and other techniques.

In general, when a co-processor decodes coded video bistreams, it first allocates local memory to store data related to a VP and allocates additional local memory (macroblock buffer) to store macroblock data. The co-processor uses this information to determine how many macroblocks should be in memory; if there is a discrepancy, an error has occurred. Thus, while decoding, if the co-processor has parsed all of the macroblock buffers but the VP data indicates that additional macroblocks remain to be processed, the co-processor stores the current location at which it is decoding in the variable ERROR_POSITION, jumps to the next resynchronization marker, and resumes processing from there. However, if the VP data indicates that other macroblocks remain but none do, the co-processor will store the current location at which it is decoding in the variable ERROR_POSITION, store the number of macroblocks decoded in the variable FORWARD_MACROBLOCK_COUNT, jump to the next resynchronization marker, and continue processing from there.

After the co-processor has finished decoding using RVLCs and the reversible Huffman table, the main processor collects (1) the total number of bits of the DCT coefficients, from the mark position to the next resynchronization marker, (2) the total number of macroblocks, computed from the number of macroblocks used by the video packet, (3) the total number of bits decoded by forward decoding, using the last forward finishing position, and (4) the number of bits decoded by backward decoding, using the last valid backward finishing position.

The main processor uses this information to determine whether to perform additional error recovery. For example, the main processor can decide to drop the current macroblocks's DCT coefficients. If the main processor detects that a video packet has errors in a macroblock header or motion vector, the main processor can replace all of the macroblocks until the next video packet with a previous frame's macroblock, or it can use other error-recovery algorithms.

As described above, a second method of data recovery is inserting resynchronization markers into a coded video bitstream at the encoder. When resynchronization markers are inserted into a coded video bitstream, a co-processor can jump to the next resynchronization marker when it encounters an error. Thus, the co-processor starts parsing again from the next resynchronization marker without having to perform RVLC decoding.

Figure 19:
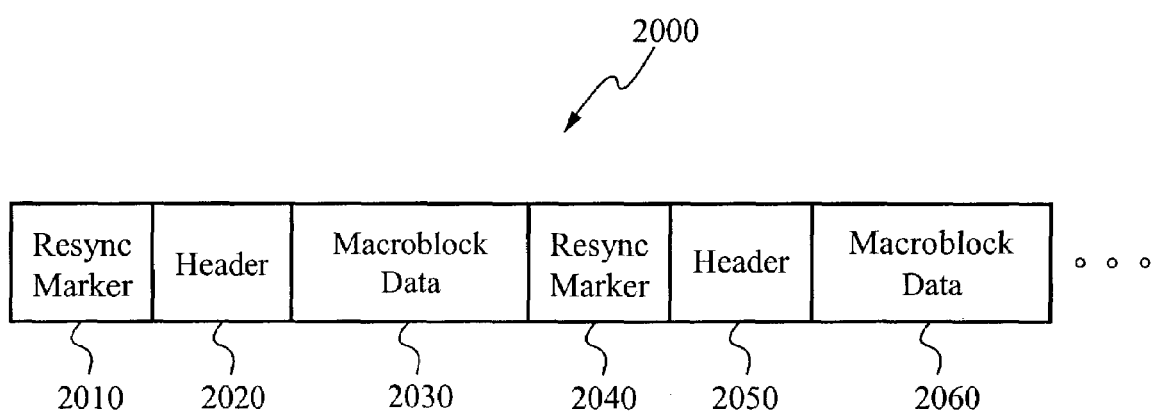
FIG. 19 shows a video packet containing resynchronization markers.

FIG. 19 shows a portion of a coded video bitstream 2000. The coded video bitstream 2000 comprises a first resynchronization marker 2010, a first header 2020, a first macroblock 2030, a second resynchronization marker 2040, a second header 2050, and a second macroblock 2060. The headers 2020 and 2050 contain information such as the macroblock number, which can be used by the main processor to reconfigure corrupted macroblocks; the quantization scale, used to decode the first macroblock in a sequence of macroblocks; and a header extension code, used to indicate if any additional information is contained in the header.

In operation, when a co-processor detects a resynchronization marker, the co-processor stores the location of the resynchronization marker in the START_POSITION_OF_VP in the error field of the macroblock, such as the error field 720 in FIG. 7. The co-processor also stores the number of macroblocks in the VP in the FORWARD_MACROBLOCK_COUNT field and the macroblock's finishing position in the FORWARD_FINISH_POSITION field of the macroblock's error field. If, while parsing the coded video bitstream 2000, the co-processor encounters an error while parsing the macroblock 2030, the co-processor sets the status field to an error value and sets the ERROR_POSITION field to the distance between the error and the previous resynchronization header. The co-processor will then skip the remaining portion of the macroblock 2030 until it parses the second resynchronization marker 2040. The co-processor will then continue processing the second macroblock 2060. When the main processor reads the status field to determine that an error has occurred, it replaces the corrupted macroblock and the following macroblocks in the video packet with corresponding macroblocks from a previous frame. It will be appreciated that when the main processor detects that an error has occurred, it can perform other error recovery routines in accordance with the present invention. It will be appreciated that increasing the number of resynchronization markers in a coded video bitstream will increase the error resiliency of the transmission but increase the number of bits that must be transmitted.

A third method that a co-processor uses for error recovery in accordance with the present invention is data partitioning. Using data partitioning, the header information for a group of macroblocks is packaged at the beginning of a coded video bitstream, followed by the corresponding group of macroblocks. Data partitioning relies on two observations: (1) header information is much smaller than macroblock data, and (2) errors occur only intermittently. Thus, by grouping the header information together, errors are more likely to occur within macroblocks, generating errors that are recoverable.

Figure 20:
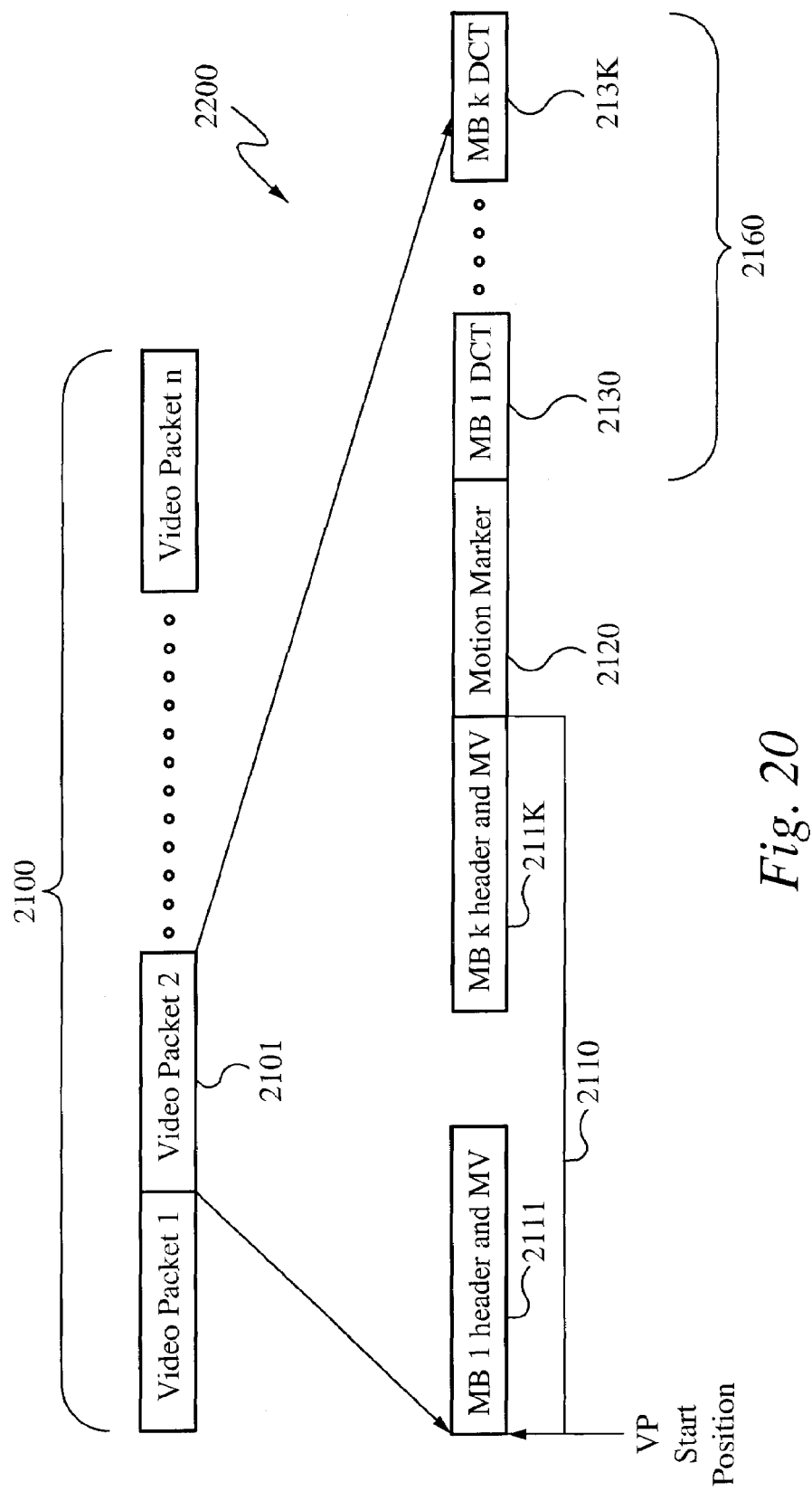
FIG. 20 shows a series of video packets used in data partitioning.

FIG. 20 shows a series of video packets 2100 and an exploded view 2200 of one video packet 2101 contained in the series of video packets 2100. The exploded view 2200 illustrates that the video packet 2101 comprises a header block 2110 containing a first header 2111 through a kth header 211K. The video packet 2101 further comprises a motion marker 2120, and a composite block 2160 containing macroblocks 2130 through 213K. FIG. 20 illustrates that the macroblock headers 2111 through 211K are all bundled together to form a single header block 2110, and the macroblocks 2130 through 213K are all bundled together to form a single composite block of macroblocks. The header 2111 contains macroblock header and motion information for the macroblock 2130. Similarly, the header 211K contains macroblock header and motion information for the macroblock 213K. The motion marker 2120 contains information used for motion compensation for all of the macroblocks in the composite block 2160.

When an encoder has packaged video pixel data using data partitioning, the decoder will first decode the macroblock headers 2110 and save the results in a co-processor frame buffer. When decoding the macroblock headers, the co-processor will set the FORWARD_FINISH_POSITION value, the BACKWARD_FINISH_POSITION value, the FORWARD_MACROBLOCK_COUNT value, and the BACKWARD_MACROBLOCK_COUNT value all to an invalid value. If the co-processor detects an error when decoding the macroblock headers 2110, the co-processor will store the location of the error in the ERROR_POSITION field. If the co-processor does not detect an error when decoding the macroblock headers 2110, it will set the value in the ERROR_POSITION field to an invalid state.

After the co-processor finishes processing all the macroblock headers in a video packet, it loads the macroblock header information from main memory into its local memory and checks the CODED_BLOCK_PATTERN field of the first macroblock. If the CODED_BLOCK_PATTERN field indicates that there are additional macroblock data to decode, the co-processor will begin decoding the next macroblock until there are no more macroblocks to decode.

If the co-processor encounters an error decoding a macroblock, the co-processor will store the location in the ERROR_POSITION field and continue parsing from the next resynchronization marker. The main processor can use this information to recover macroblock data by, for example, using motion vectors to predict the missing macroblocks using motion compensation. If the macroblock header and motion vectors contain corrupted data, the main processor can replace the following macroblocks through the next video packet, with a previous frame's macroblocks, discarding the macroblocks in the corrupted frame.

Because the co-processor decodes macroblock headers before decoding macroblocks, the co-processor allocates memory for the macroblock headers in a VP. If the decoder finishes processing the allotted macroblock headers but there remain macroblocks to process, the co-processor will ignore the remaining macroblocks in the VP, store the current location at which it is decoding in the variable ERROR_POSITION, jump to the next resynchronization marker, and continue processing from there. If however, the co-processor processes all of the macroblocks and macroblock headers remain to be processed, the co-processor will store the location at which it is decoding in the variable ERROR_POSITION, store the number of macroblocks decoded in the variable FORWARD_MACROBLOCK_COUNT, jump to the next video packet, and resume processing from there.

It will be appreciated that in the above examples, the variables, such as ERROR_POSITION, FORWARD_MACROBLOCK_COUNT, BACKWARD_MACROBLOCK_COUNT, FORWARD_FINISH_POSITION, BACKWARD_FINISH_POSITION, etc., are used by a main processor to determine whether and how to recover from errors encountered in a coded video bitstream.

The present invention describes an apparatus and a method of efficiently decoding a coded video bitstream in accordance with the MPEG-4 standard. Using embodiments of the present invention, a main processor, configured to perform high-level tasks, and a co-processor, configured to perform variable-length decoding, run in parallel. The main processor parses high-level information and calls the co-processor to perform low-level tasks, such as decompressing macroblocks compressed according to the MPEG-4 standard. The main processor translates the decompressed macroblocks to digital pixel data. Furthermore, the main processor oversees error recovery routines executed by the main processor, the co-processor, or both.

It will be readily apparent to one skilled in the art that other various modifications may be made to the embodiments without departing from the spirit and scope of the invention as defined by the appended claims. For example, it will be appreciated that while the above embodiments have been described in reference to the MPEG-4 standard, the invention also includes processing video data according to other video processing standards.

We claim:

1. A data processing system for translating a coded bitstream delimited by a plurality of markers into decoded pixel data suitable for rendering video images, the data processing system comprising:

a. a first processor configured to parse the coded bitstream and divide the coded bitstream into multiple segments delimited by the plurality of markers; and b. a second processor configured to process a portion of the multiple segments and translate the portion of the multiple segments into decoded data elements, wherein the first processor processes the decoded data elements to generate the decoded pixel data suitable for rendering video images and further wherein the first processor and the second processor are configured to operate in parallel.

2. The data processing system of claim 1, wherein the second processor is configured to process variable-length data.

3. The data processing system of claim 2, wherein the second processor comprises a reduced instruction set computer.

4. The data processing system of claim 1, wherein the coded bitstream is a compressed bitstream.

5. The data processing system of claim 4, wherein the compressed bitstream is encoded according to an MPEG standard.

6. The data processing system of claim 5, wherein the MPEG standard is the MPEG-4 standard.

7. The data processing system of claim 4, wherein the compressed bitstream is encoded according to a JPEG standard.

8. The data processing system of claim 4, wherein the compressed bitstream is encoded according to one of the H.261 standard and the H.263 standard.

9. The data processing system of claim 6, wherein the markers are video object plane start codes indicating the start of a video object.

10. The data processing system of claim 6, wherein the decoded data elements comprise macroblocks containing integers representing discrete cosine transform (DCT) coefficients of the pixel data.

11. The data processing system of claim 10, wherein the first processor processing the data elements to generate pixel data comprises:
  a. dequantizing the DCT coefficients to generate dequantized DCT coefficients; and
  b. performing an inverse DCT transformation on the dequantized DCT coefficients to generate the pixel data.

12. The data processing system of claim 1, further comprising:
  a. an external memory configured to store a portion of the coded bitstream and a portion of the decoded data elements; and
  b. a high-speed bus coupling the first processor and the second processor to the external memory.

13. The data processing system of claim 12, wherein the first processor comprises a first cache.

14. The data processing system of claim 13, wherein the second processor comprises a second cache.

15. A data processing system for translating a coded bitstream delimited by a plurality of markers into decoded pixel data suitable for rendering video images, the data processing system comprising:
  a. a first means for processing configured to parse the coded bitstream and divide the coded bitstream into multiple segments delimited by the plurality of markers; and
  b. a second means for processing configured to process a portion of the multiple segments and translate the portion of the multiple segments into decoded data elements,
    wherein the first means for processing processes the decoded data elements to generate the decoded pixel data suitable for rendering video images and further wherein the first means for processing and the second means for processing are configured to operate in parallel.

16. The data processing system of claim 15, wherein the second means for processing is configured to process variable-length data.

17. The data processing system of claim 16, wherein the second means for processing comprises a reduced instruction set computer.

18. The data processing system of claim 15, wherein the coded bitstream is a compressed bitstream.

19. The data processing system of claim 18, wherein the compressed bitstream is encoded according to an MPEG standard.

20. The data processing system of claim 19, wherein the MPEG standard is the MPEG-4 standard.

21. The data processing system of claim 18, wherein the compressed bitstream is encoded according to a JPEG standard.

22. The data processing system of claim 18, wherein the compressed bitstream is encoded according to one of the H.261 standard and the H.263 standard.

23. The data processing system of claim 20, wherein the markers are video object plane start codes indicating the start of a video object.

24. The data processing system of claim 20, wherein the decoded data elements comprise macroblocks containing integers representing discrete cosine transform (DCT) coefficients of the pixel data.

25. The data processing system of claim 24, wherein the first means for processing processes the data elements to generate pixel data comprises:
  a. dequantizing the DCT coefficients to generate dequantized DCT coefficients; and
  b. performing an inverse DCT transformation on the dequantized DCT coefficients to generate the pixel data.

26. The data processing system of claim 15, further comprising:
  a. an external memory configured to store a portion of the coded bitstream and a portion of the decoded data elements; and
  b. a high-speed bus coupling the first means for processing and the second means for processing to the external memory.

27. The data processing system of claim 26, wherein the first means for processing comprises a first cache.

28. The data processing system of claim 27, wherein the second means for processing comprises a second cache.

29. A method of translating a coded bitstream delimited by a plurality of markers into decoded pixel data suitable for rendering video images, the method comprising:
  a. dividing the coded bitstream into a plurality of blocks by a first processor, the plurality of blocks comprising compressed data elements delimited by the plurality of markers;
  b. parsing in a first direction the compressed data elements by a second processor to translate the compressed data elements into decompressed data elements; and
  c. generating the decoded pixel data suitable for rendering video images from the decompressed data elements by the first processor,
    wherein the first processor and the second processor are configured to operate in parallel.

30. The method of claim 29, wherein the coded bitstream is coded according to a JPEG standard.

31. The method of claim 29, wherein the coded bitstream is coded according to one of the H.261 standard and the H.263 standard.

32. The method of claim 29, wherein the coded bitstream is coded according to an MPEG standard.

33. The method of claim 32, wherein the MPEG standard is MPEG-4.

34. The method of claim 29, wherein the compressed data elements are Huffman codes of integers representing discrete cosine transform (DCT) coefficients of a video image and the decompressed data elements are the corresponding integers representing discrete cosine transform coefficients of a video image.

35. The method of claim 34, wherein generating the pixel data from the decompressed data elements comprises:
   a. dequantizing the DCT coefficients to produce dequantized DCT coefficients; and
   b. performing an inverse DCT transformation on the dequantized DCT coefficients to generate the pixel data.

36. The method of claim 35, wherein generating the pixel data from the compressed data elements further comprises performing motion compensation on the dequantized DCT coefficients to generate the pixel data.

37. The method of claim 29, wherein the first processor performs the step of dividing a coded bitstream representing a first video object while the second processor performs the step of translating the compressed data elements into decompressed data elements representing a second video object.

38. The method of claim 37, wherein when an error is encountered during the step of translating the decompressed data elements by a second processor, the second processor transmits an error message to the first processor.

39. The method of claim 38, wherein when the first processor receives the error message from the second processor, the first processor transmits a start error recovery message to the second processor.

40. The method of claim 39, wherein when the second processor receives a start error recovery message from the first processor, the second processor performs an error recovery routine.

41. The method of claim 40, wherein an error is encountered when an integer in the coded bitstream does not have a corresponding entry in a Huffman table, and further wherein the error recovery routine comprises sequentially parsing in a second direction the compressed data elements and translating the compressed data elements into decompressed data elements corresponding to entries in a reversible Huffman table, the second direction opposite to the first direction.

42. The method of claim 29, wherein translating the compressed data elements comprises sequentially translating the compressed data elements into decompressed data elements using run-length decoding.

43. The method of claim 29, wherein translating the compressed data elements comprises sequentially translating the compressed data elements into decompressed data elements using arithmetic decoding.

44. The method of claim 39, wherein when the first processor receives an error signal from the second processor, the first processor replaces the data elements with data elements corresponding to a third video object different from the second video object.

45. The method of claim 29, wherein the coded bitstream is encoded as partitioned data.

46. The method of claim 29, wherein the markers are resynchronization markers.

47. The method of claim 46, wherein when the second processor encounters an error after parsing a first resynchronization marker, the second processor transmits an error signal to the first processor and continues translating from a second resynchronization marker.

48. A compressed bitstream decoding system for translating a coded compressed bitstream delimited by a plurality of markers into decoded pixel data suitable for rendering video images, the compressed bistream decoding system comprising:
   a. a first processor configured to parse the coded compressed bitstream and divide the coded compressed bitstream into multiple segments delimited by the plurality of markers; and
   b. a second processor configured to process a portion of the multiple segments and translate the portion of the multiple segments into decoded data elements,
      wherein the first processor processes the data elements to generate the decoded pixel data suitable for rendering video images and further wherein the first processor and the second processor are configured to operate in parallel.

49. The compressed bitstream decoding system of claim 48, wherein the second processor is configured to process variable-length data.

50. The compressed bitstream decoding system of claim 49, wherein the second processor comprises a reduced instruction set computer.

51. The compressed bitstream decoding system of claim 48, wherein the coded compressed bitstream is encoded according to an MPEG standard.

52. The compressed bitstream decoding system of claim 51, wherein the MPEG standard is the MPEG-4 standard.

53. The compressed bitstream decoding system of claim 48, wherein the coded compressed bitstream is encoded according to a JPEG standard.

54. The compressed bitstream decoding system of claim 48, wherein the coded compressed bitstream is encoded according to one of the H.261 standard and the H.263 standard.

55. The compressed bitstream decoding system of claim 52, wherein the markers are video object plane start codes indicating the start of a video object.

56. The compressed bitstream decoding system of claim 52, wherein the decoded data elements comprise macroblocks containing integers representing discrete cosine transform (DCT) coefficients of the pixel data.

57. The compressed bitstream decoding system of claim 56, wherein the first processor processing the data elements to generate pixel data comprises:
   a. dequantizing the DCT coefficients to generate dequantized DCT coefficients; and
   b. performing an inverse DCT transformation on the dequantized DCT coefficients to generate the pixel data.

58. The compressed bitstream decoding system of claim 48, further comprising:
   a. an external memory configured to store a portion of the coded compressed bitstream and a portion of the decoded data elements; and
   b. a high-speed bus coupling the first processor and the second processor to the external memory.

59. The compressed bitstream decoding system of claim 58, wherein the first processor comprises a first cache.

60. The compressed bitstream decoding system of claim 59, wherein the second processor comprises a second cache.

61. A data processing system for processing digital pixel data, comprising:

a. an encoder for encoding the digital pixel data into a coded bistream comprising a plurality of segments delimited by markers;

b. a decoder configured to receive the coded bitstream from the encoder, the decoder comprising a first processor configured to parse the coded bitstream and divide the coded bitstream into multiple segments delimited by the plurality of markers and a second processor configured to process a portion of the multiple segments and translate the portion of the multiple segments into decoded data elements, wherein the first processor processes the decoded data elements to generate the digital pixel data suitable for rendering video images and further wherein the first processor and the second processor are configured to operate in parallel.

62. The data processing system of claim 61, wherein the second processor is configured to process variable-length data.

63. The data processing system of claim 62, wherein the second processor comprises a reduced instruction set computer.

64. The data processing system of claim 61, wherein the compressed bitstream is encoded according to an MPEG standard.

65. The data processing system of claim 64, wherein the MPEG standard is the MPEG-4 standard.

66. The data processing system of claim 61, wherein the compressed bitstream is encoded according to a JPEG standard.

67. The data processing system of claim 61, wherein the compressed bitstream is encoded according to one of the H.261 standard and the H.263 standard.

68. The data processing system of claim 65, wherein the markers are video object plane start codes indicating the start of a video object.

69. The data processing system of claim 65, wherein the decoded data elements comprise macroblocks containing integers representing discrete cosine transform (DCT) coefficients of the pixel data.

70. The data processing system of claim 69, wherein the first processor processing the data elements to generate pixel data comprises:

a. dequantizing the DCT coefficients to generate dequantized DCT coefficients; and b. performing an inverse DCT transformation on the dequantized DCT coefficients to generate the pixel data.

71. The data processing system of claim 61, further comprising:

a. an external memory configured to store a portion of the coded bitstream and a portion of the decoded data elements; and b. a high-speed bus coupling the first processor and the second processor to the external memory.

72. The data processing system of claim 71, wherein the first processor comprises a first cache.

73. The data processing system of claim 72, wherein the second processor comprises a second cache.

74. The data processing system of claim 61, further comprising a transmission medium coupling the encoder to the decoder.

75. The data processing system of claim 74, wherein the transmission medium comprises a network.

76. A data processing system for translating a coded bitstream delimited by a plurality of markers into decoded pixel data suitable for rendering video images, the data processing system comprising:

a. a first processor which reads the coded video bitstream, stores the coded video bitstream in a local memory, parses the coded bitstream and divides the coded bitstream into multiple segments delimited by the plurality of markers; and b. a second processor which receives instructions from the first processor to process a portion of the multiple segments and translate the portion of the multiple segments into decoded data elements to recover macroblock information, wherein the first processor processes the decoded data elements to generate the decoded pixel data suitable for rendering video images and further wherein the first processor and the second processor are configured to operate simultaneously such that while the second processor is translating the portion of the multiple segments into decoded data elements to recover macroblock information, the first processor is processing a portion of the coded bitstream related to another frame.

77. A method of translating a coded bitstream delimited by a plurality of markers into decoded pixel data suitable for rendering video images, the method comprising:

a. dividing the coded bitstream into a plurality of blocks by a first processor, the plurality of blocks comprising compressed data elements delimited by the plurality of markers;

b. parsing in a first direction the compressed data elements by a second processor to translate the compressed data elements into decompressed data elements to recover macroblock information; and c. generating the decoded pixel data suitable for rendering video images from the decompressed data elements by the first processor, wherein the first processor and the second processor are configured to operate simultaneously such that while the second processor is translating the compressed data elements into decompressed data elements to recover macroblock information, the first processor is processing a portion of the coded bitstream related to another frame.

* * * * *

UNITED STATES PATENT AND TRADEMARK OFFICE
CERTIFICATE OF CORRECTION

PATENT NO. : 7,660,352 B2  Page 1 of 1
APPLICATION NO. : 10/406840
DATED : February 9, 2010
INVENTOR(S) : Yamane et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1277 days.

Signed and Sealed this

Thirtieth Day of November, 2010

David J. Kappos
*Director of the United States Patent and Trademark Office*